US011247630B2

(12) United States Patent
Kobayashi et al.

(10) Patent No.: US 11,247,630 B2
(45) Date of Patent: Feb. 15, 2022

(54) SIDE AIRBAG APPARATUS

(71) Applicant: Autoliv Development AB, Vargarda (SE)

(72) Inventors: Yuto Kobayashi, Kanagawa (JP); Makoto Fuma, Kanagawa (JP); Naoki Hatakeyama, Kanagawa (JP); Shotetsu Sen, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 21 days.

(21) Appl. No.: 16/488,961

(22) PCT Filed: Jan. 5, 2018

(86) PCT No.: PCT/JP2018/000101
§ 371 (c)(1),
(2) Date: Aug. 27, 2019

(87) PCT Pub. No.: WO2018/154979
PCT Pub. Date: Aug. 30, 2018

(65) Prior Publication Data
US 2019/0375365 A1 Dec. 12, 2019

(30) Foreign Application Priority Data
Feb. 27, 2017 (JP) .............................. JP2017-034889

(51) Int. Cl.
*B60R 21/231* (2011.01)
*B60R 21/207* (2006.01)
*B60R 21/237* (2006.01)

(52) U.S. Cl.
CPC ...... *B60R 21/23138* (2013.01); *B60R 21/207* (2013.01); *B60R 21/237* (2013.01); *B60R 2021/23146* (2013.01)

(58) Field of Classification Search
CPC ............ B60R 21/23138; B60R 21/201; B60R 21/207; B60R 21/237; B60R 2021/23146
See application file for complete search history.

(56) References Cited

U.S. PATENT DOCUMENTS 6,364,348 B1 * 4/2002 Jang .................... B60R 21/2171
280/730.2
2010/0052300 A1 * 3/2010 Sugimoto ......... B60R 21/23138
280/743.1

(Continued)

FOREIGN PATENT DOCUMENTS

EP 1122134 A1 8/2001
EP 2862752 A1 4/2015

(Continued)

OTHER PUBLICATIONS

Written Opinion of the International Searching Authority (in Japanese and English) dated Apr. 10, 2018 in corresponding PCT/JP2018/000101.

(Continued)

*Primary Examiner* — Jonathan Ng
*Assistant Examiner* — Scott F. Underwood
(74) *Attorney, Agent, or Firm* — Harness, Dickey & Pierce, P.L.C.; Stephen T. Olson

(57) ABSTRACT

Problem: To provide a side airbag apparatus which can prevent the deterioration of the neck damage value of a passenger during a side collision or sufficiently protect the waist of the passenger.
Resolution Means: A side airbag apparatus 100 installed in a vehicle, including: a bag shaped cushion 114 which is housed in a seat back 104 of a vehicle seat 102 and expanded and deployed on the side of the vehicle seat utilizing gas supplied from an inflator 116; and a holding part 128 for retaining the shape in the housed state of the cushion, wherein the cushion is wound or folded in a long shape in (Continued)

the vertical direction of the vehicle and housed in the seat back in the shape with the upper part 126 thereof further folded back to the anterior of the vehicle, and wherein the holding part retains the upper part or lower part of the cushion which is folded back to the anterior of the vehicle.

3 Claims, 15 Drawing Sheets

(56) References Cited

U.S. PATENT DOCUMENTS

| | | | |
|---|---|---|---|
| 2014/0246844 A1* | 9/2014 | Richards | B60R 21/207 280/728.2 |
| 2017/0028962 A1 | 2/2017 | Goto et al. | |

FOREIGN PATENT DOCUMENTS

| | | | | |
|---|---|---|---|---|
| ES | 2505418 | A1 | * | 10/2014 |
| JP | 2000-016222 | A | | 1/2000 |
| JP | 2001-213262 | A | | 8/2001 |
| JP | 2002-067853 | A | | 3/2002 |
| JP | 2002067853 | A | * | 3/2002 |
| JP | 2003-104155 | | | 4/2003 |
| JP | 2011-025818 | A | | 2/2011 |
| JP | 2015-081082 | A | | 4/2015 |
| JP | 2015074295 | A | | 4/2015 |
| JP | 2016-084037 | A | | 5/2016 |
| JP | 2016-168916 | A | | 9/2016 |
| WO | WO-9856623 | A1 | * | 12/1998 ........... B60R 21/237 |
| WO | 2016143196 | A1 | | 9/2016 |

OTHER PUBLICATIONS

Office Action received for the Japanese Patent Application No. 2019-501101, dated Jul. 7, 2020, 8 pages (4 pages of Original Copy and 4 pages of English Translation).

Decision to Grant received for the Japanese Patent Application No. 2019-501101, dated Nov. 4, 2020, 5 pages (2 pages of Original Copy and 3 pages of English Translation).

Decision to Grant received for the Korean Patent Application No. 10-2019-7026491, dated Jan. 7, 2021, 4 pages (2 pages of Original Copy and 2 pages of English Translation).

Extended European Search Report received for the European Patent Application No. 18758018.8, dated Sep. 14, 2020, 7 pages.

* cited by examiner

[FIG. 1]
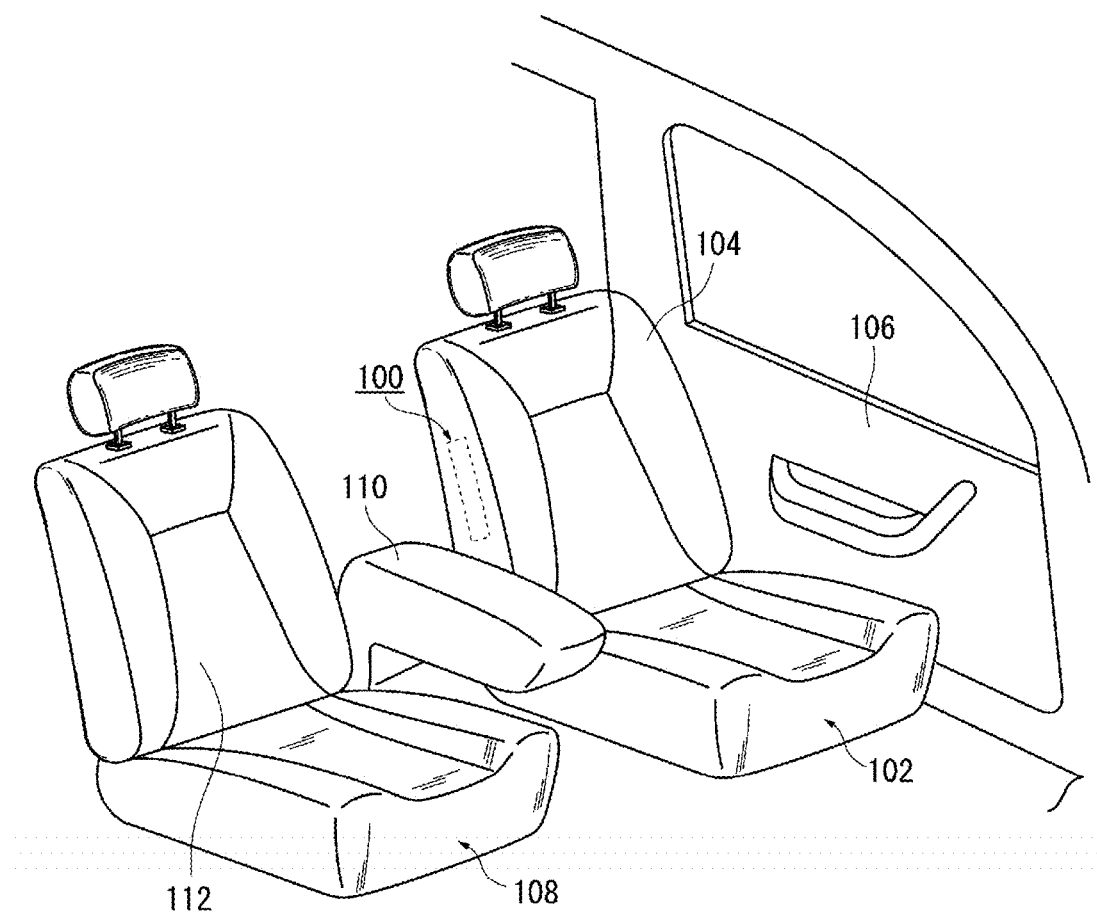

[FIG. 2]
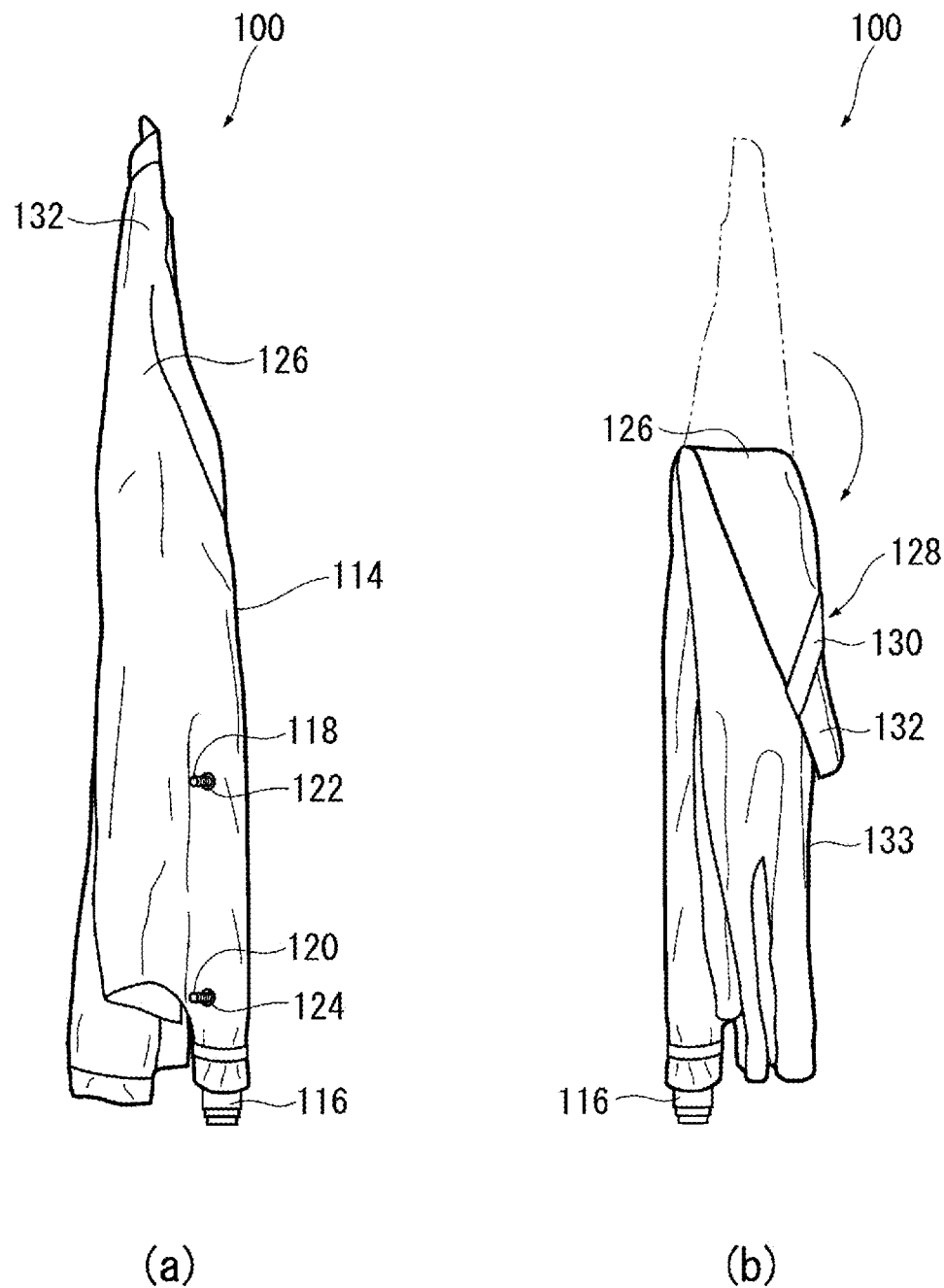
(a)          (b)

[FIG. 3]
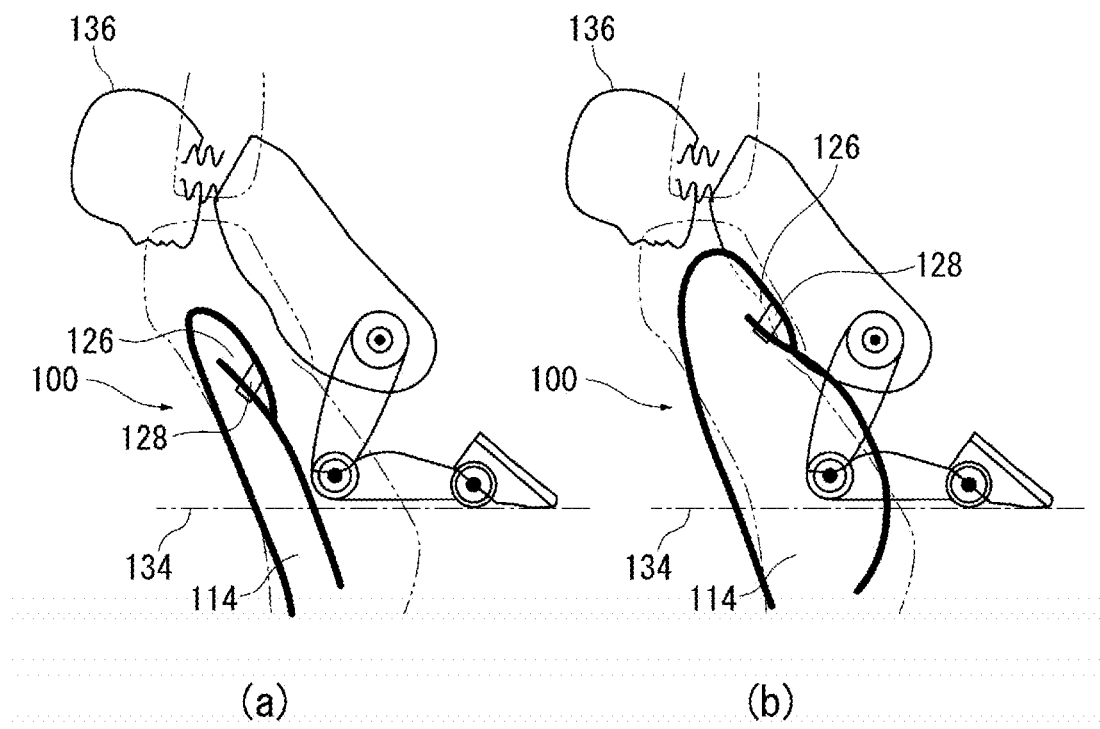
(a) (b)
[FIG. 4]
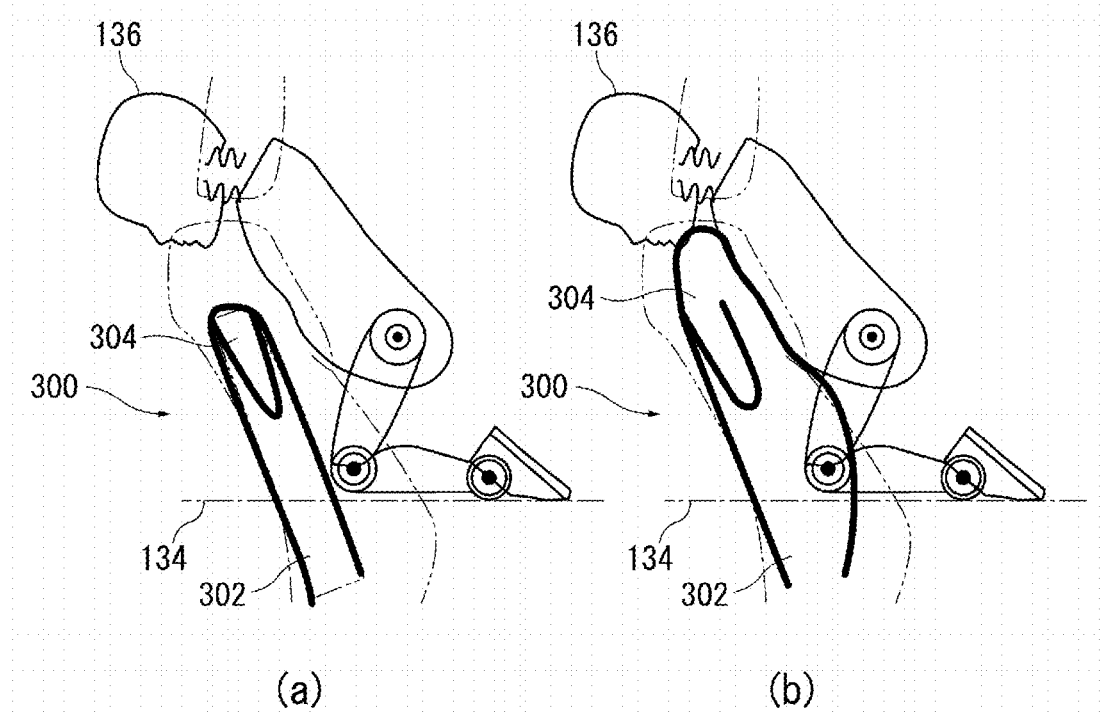
(a) (b)

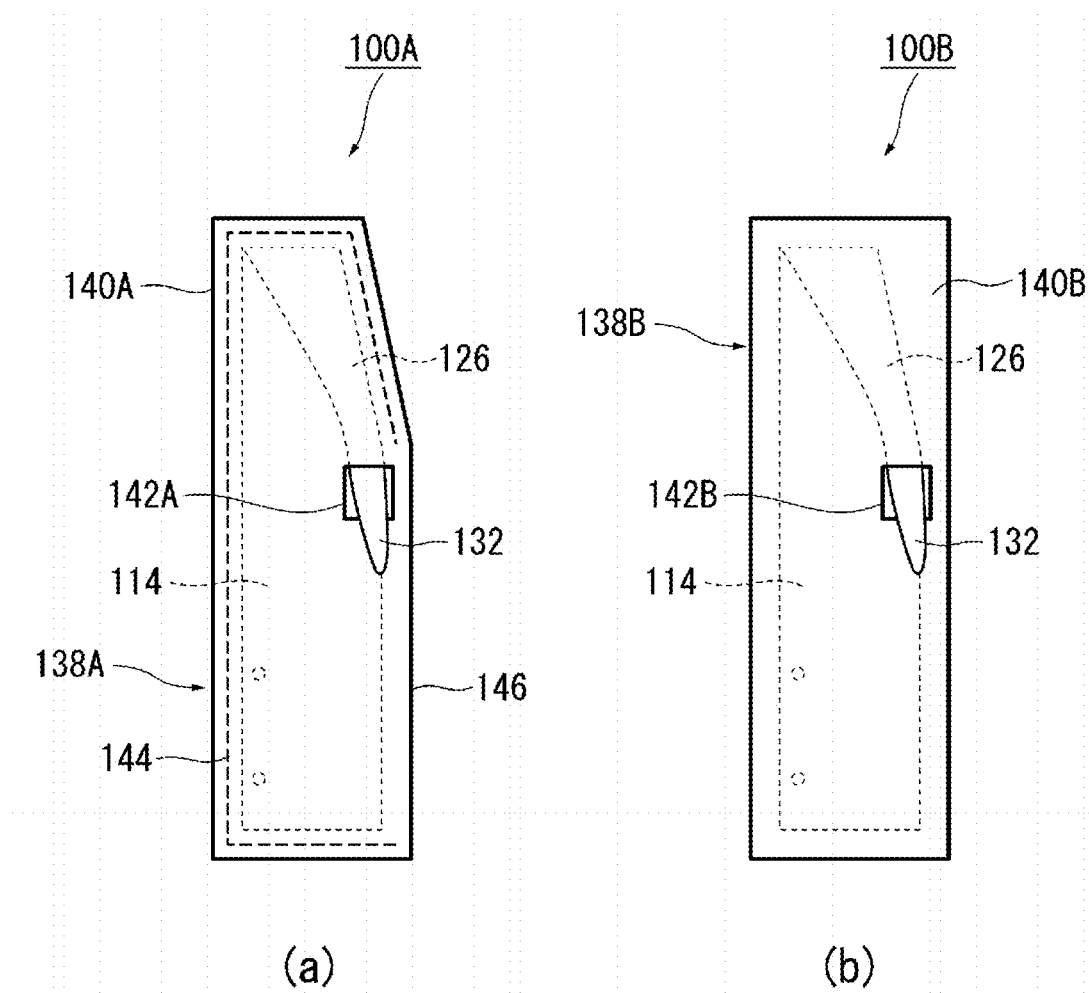

[FIG. 6]
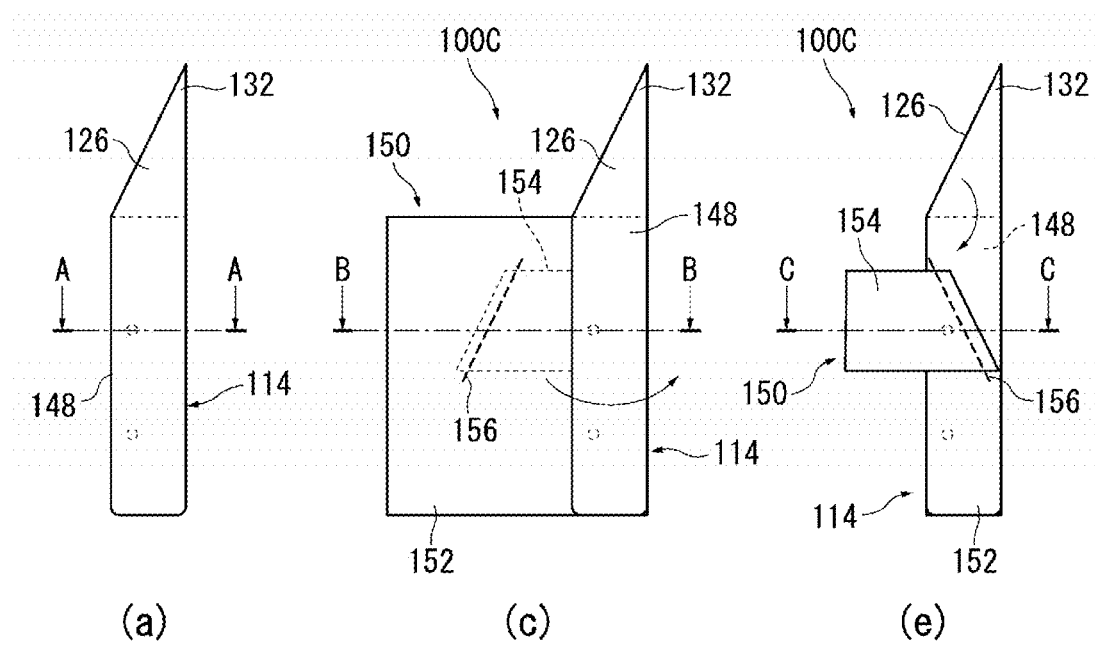
(a)     (c)     (e)
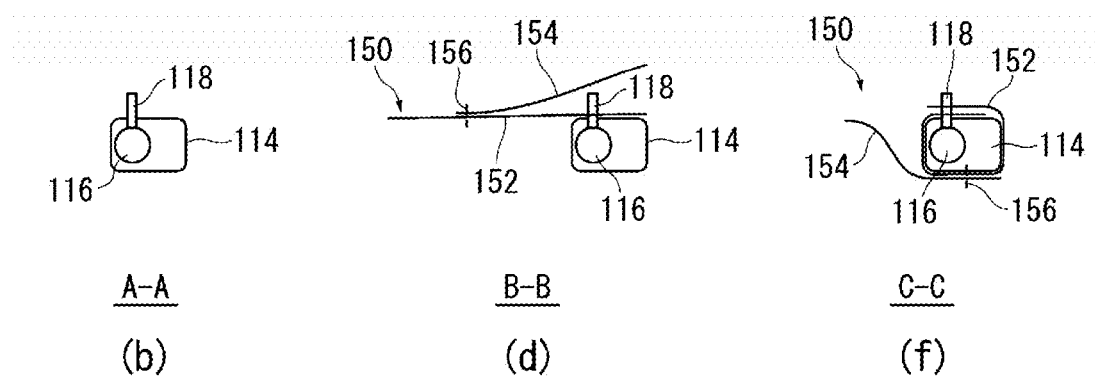
A-A     B-B     C-C
(b)     (d)     (f)

[FIG. 7]
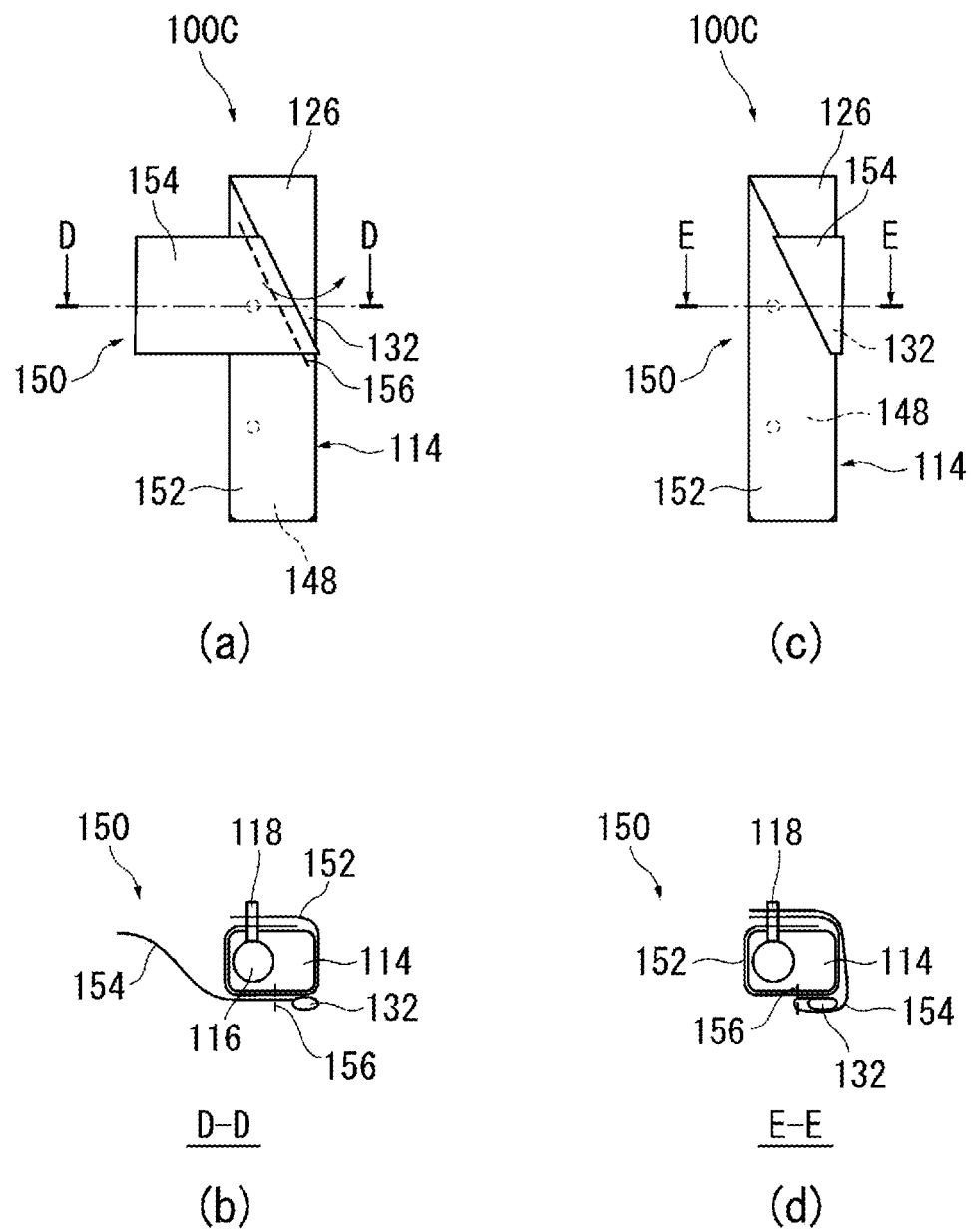

[FIG. 8]
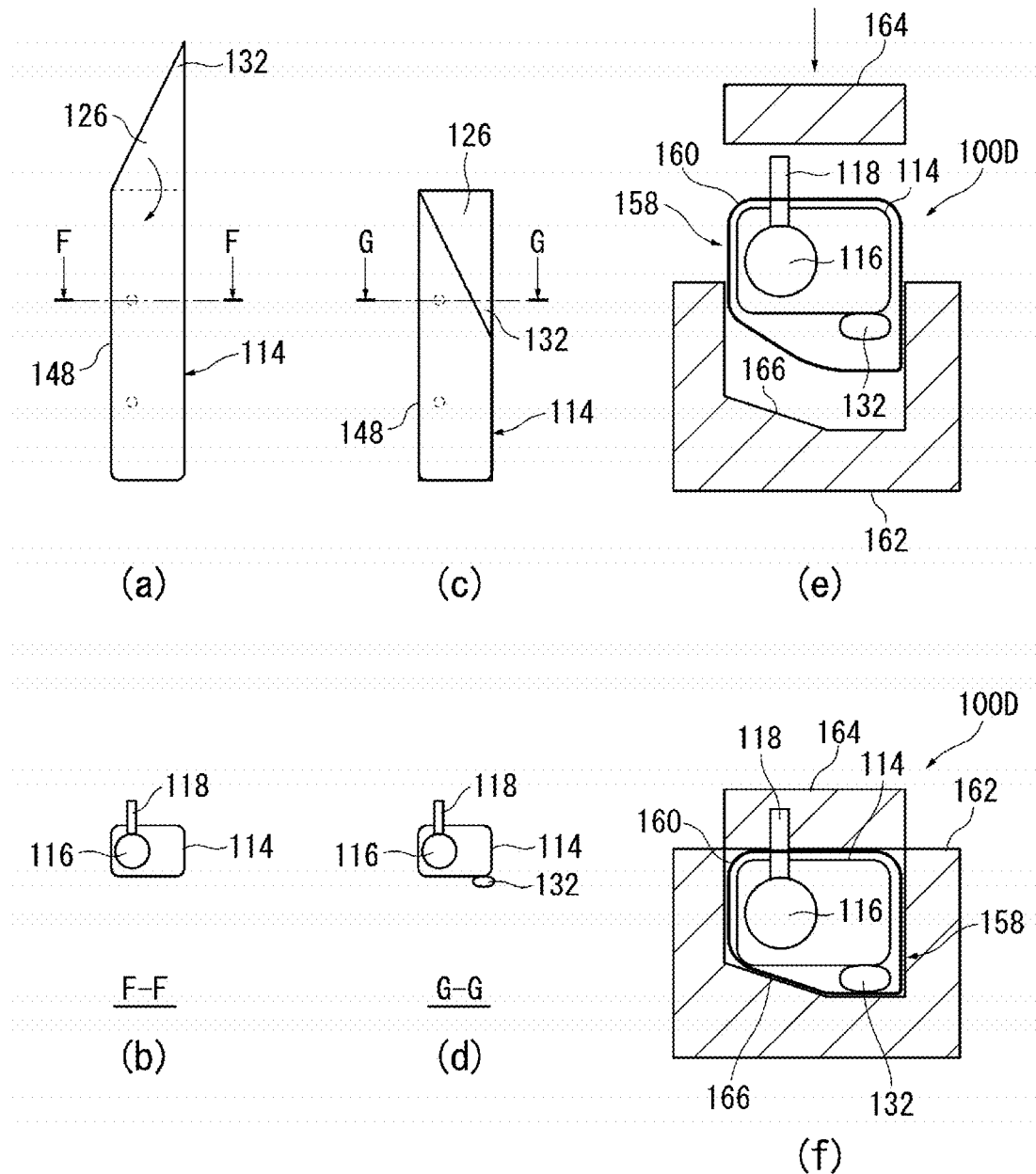

[FIG. 9]
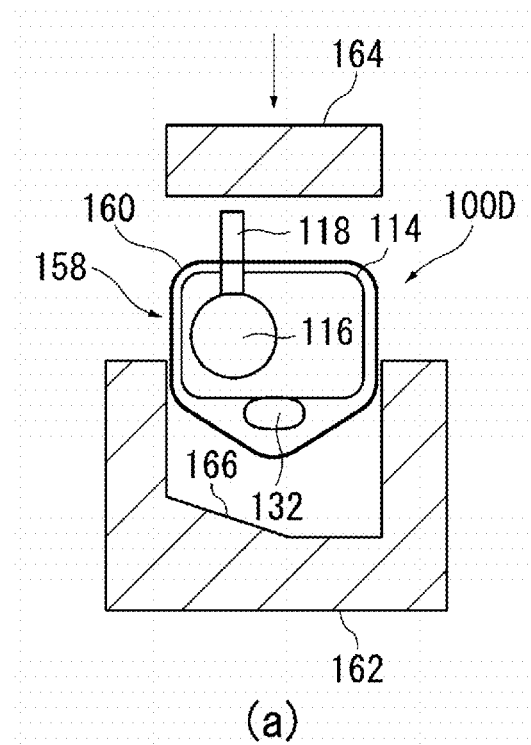
(a)
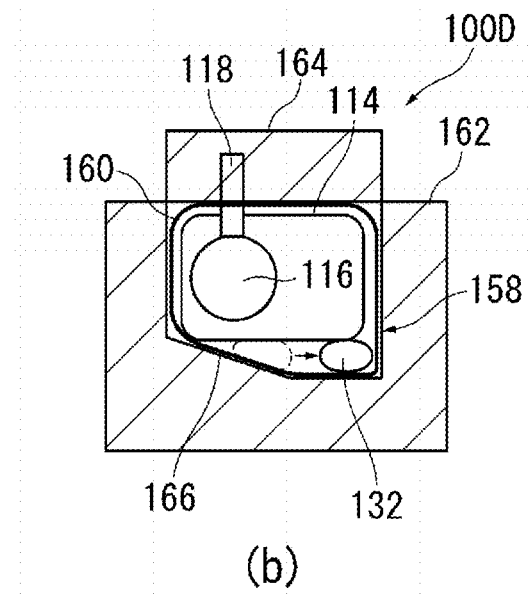
(b)

[FIG. 10]
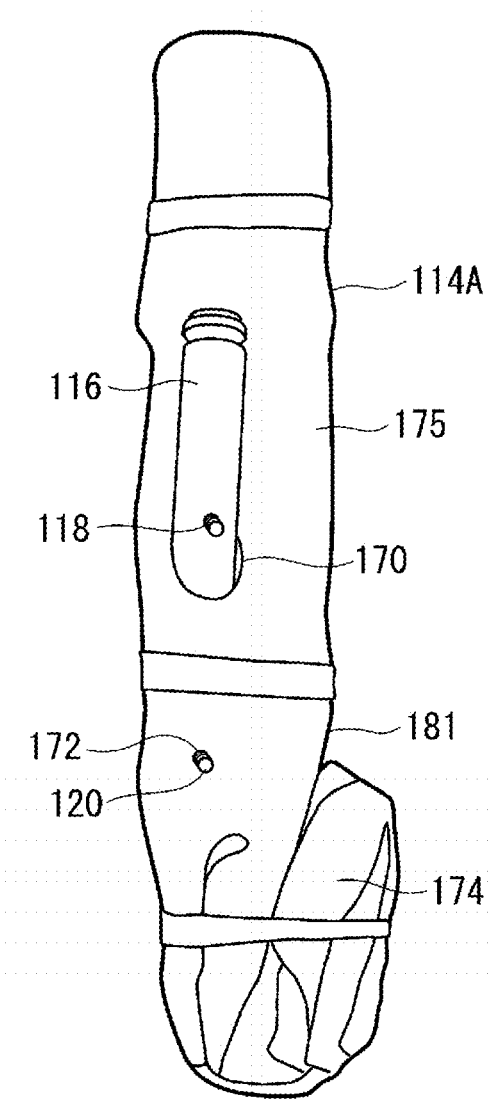

[FIG. 11]
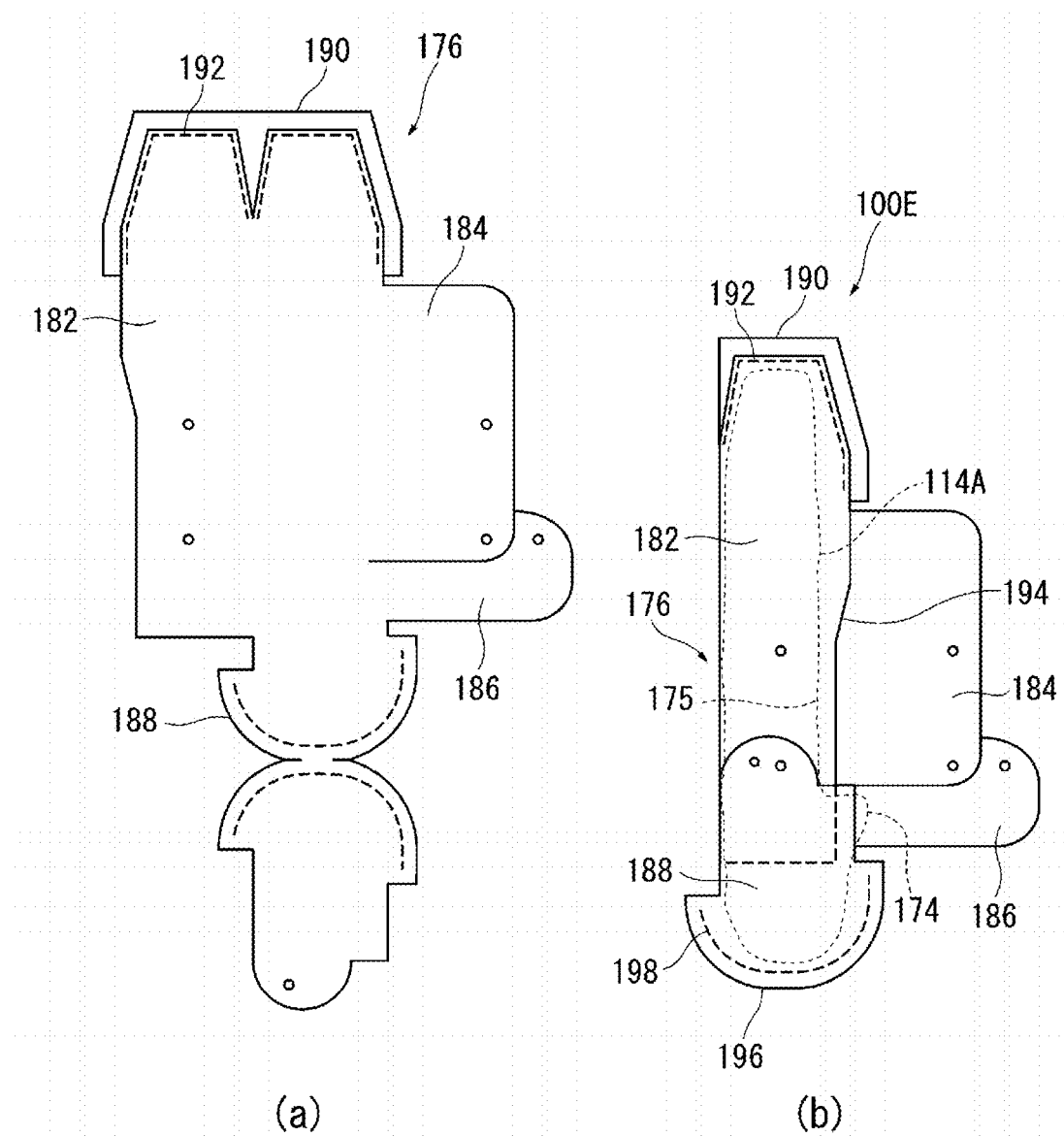

[FIG. 12]
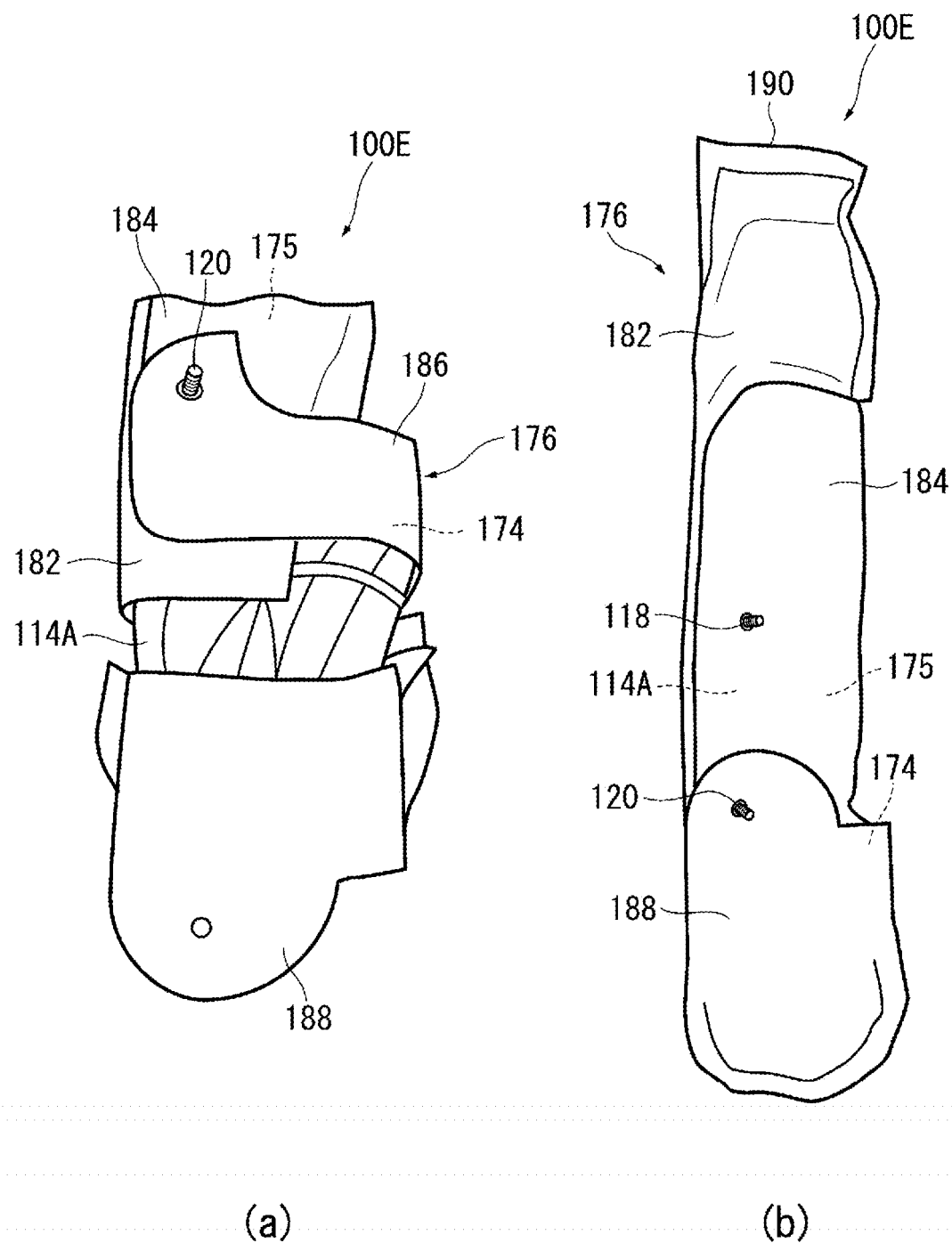
(a)　　　　　　　　　(b)

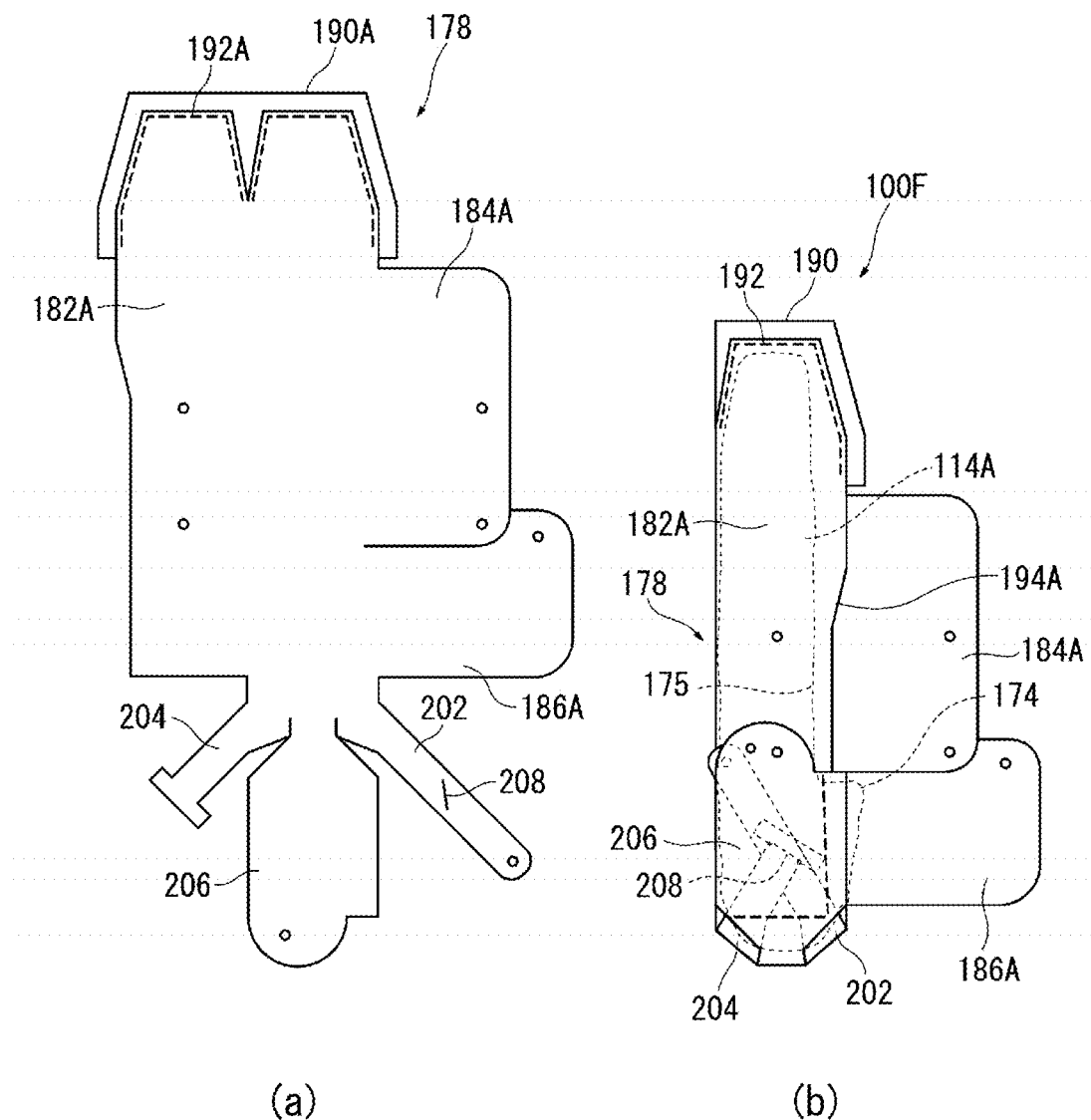
[FIG. 13]
(a) (b)

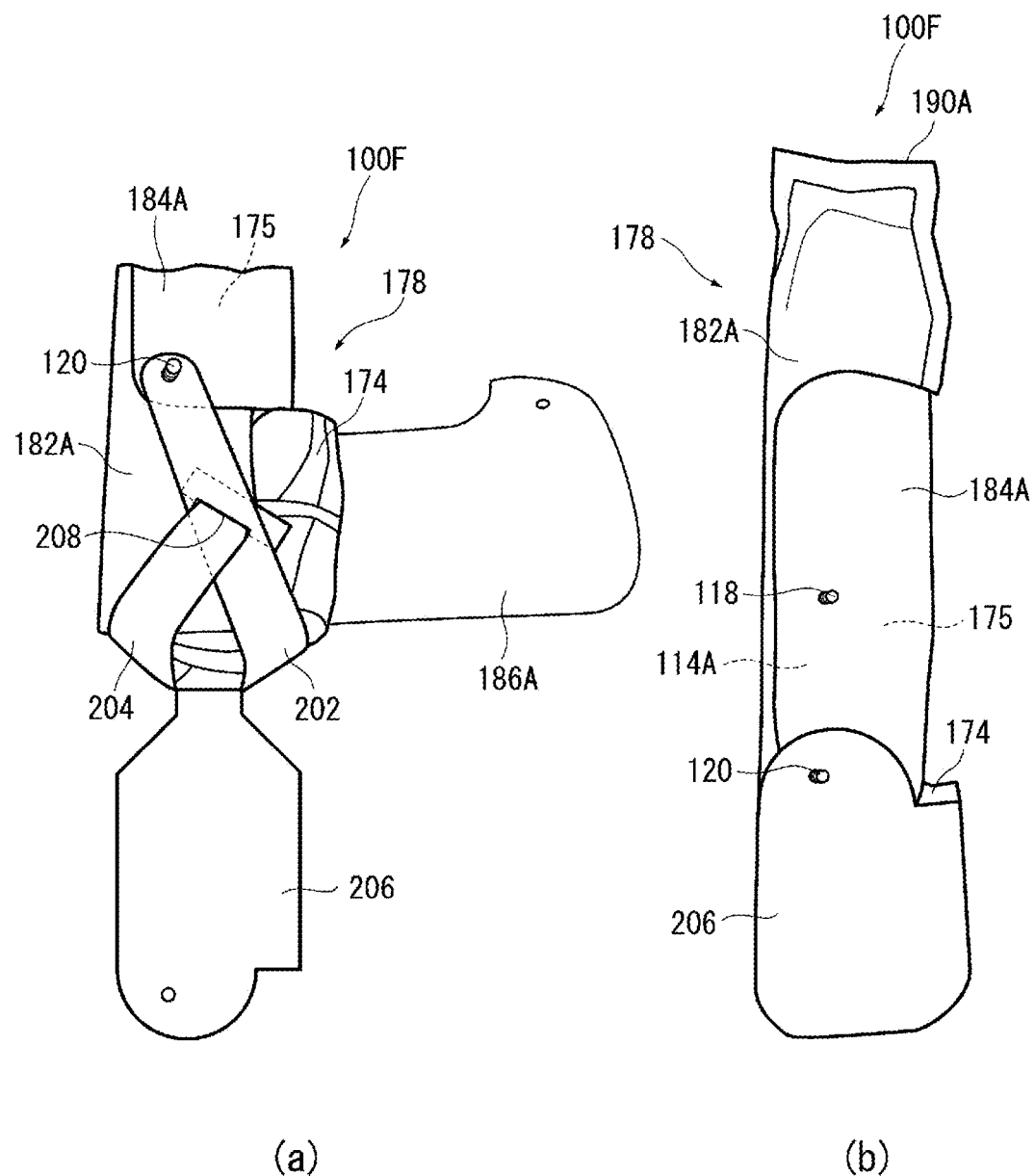
[FIG. 14]
(a)　　　(b)

[FIG. 15]
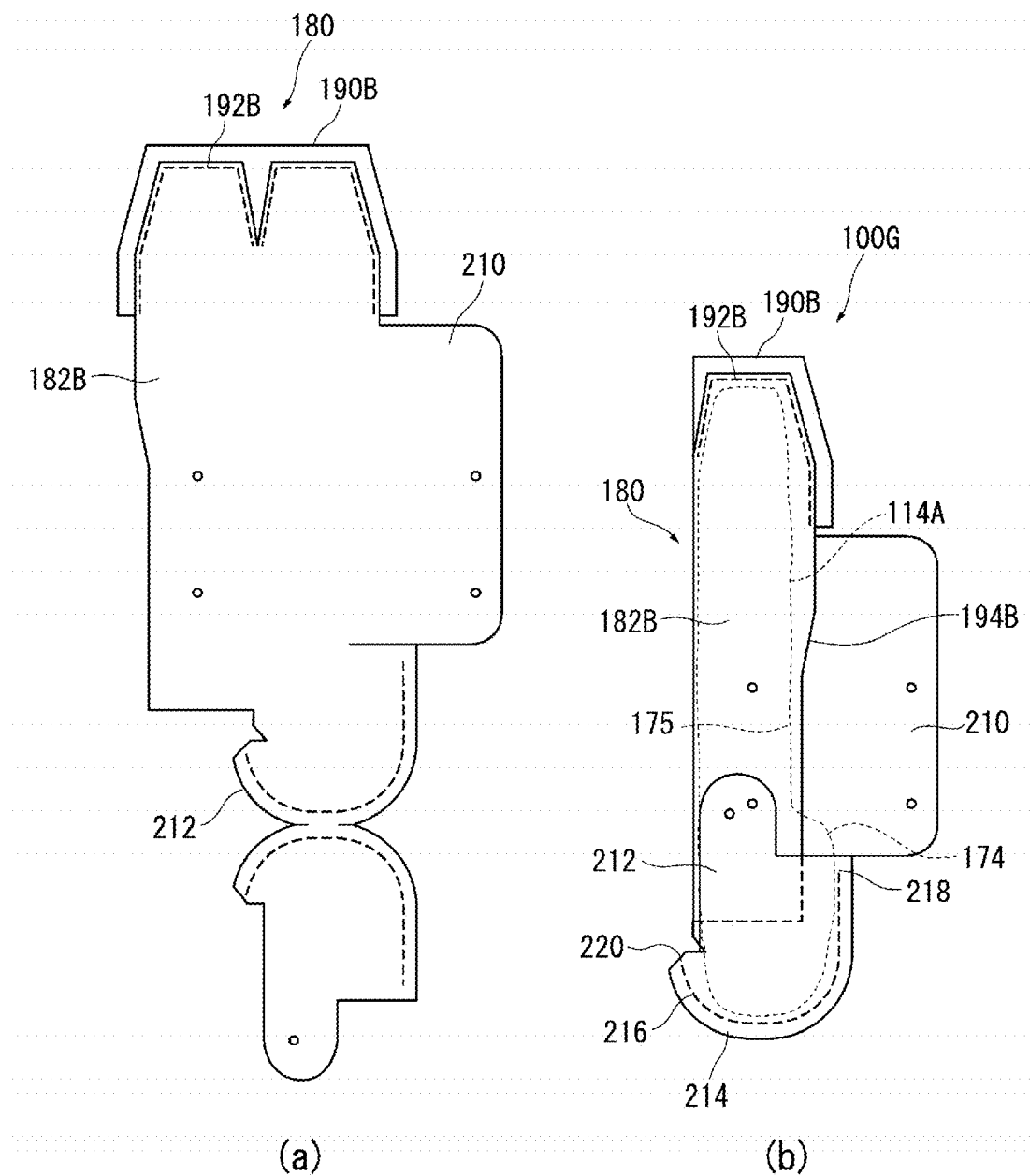

[FIG. 16]
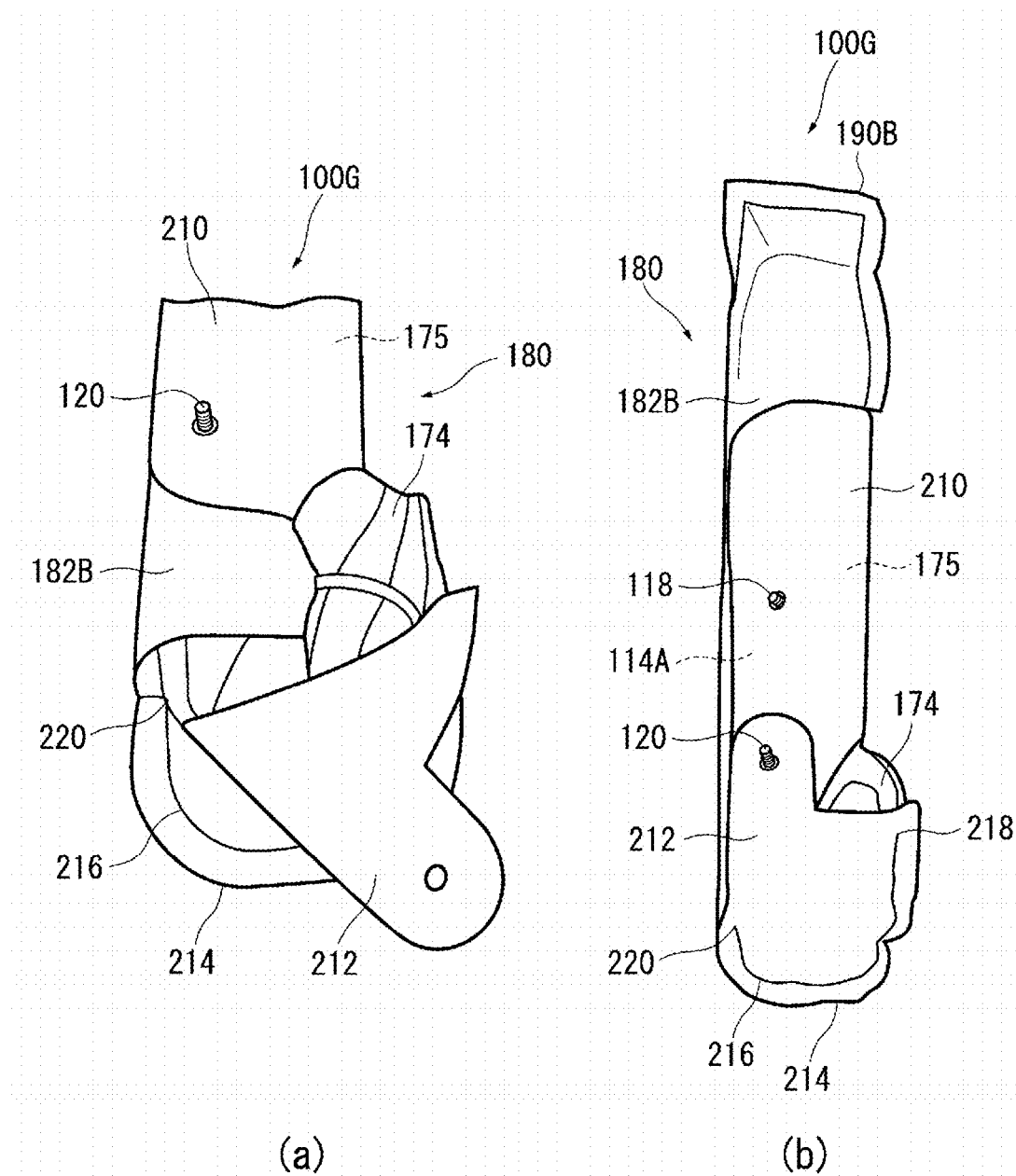
(a)  (b)

SIDE AIRBAG APPARATUS

TECHNICAL FIELD

The present invention relates to a side airbag apparatus which is installed in a vehicle and expanded and deployed in order to protect a passenger in case of an emergency.

BACKGROUND

A side airbag apparatus is a safety apparatus which is operated in case of an emergency such as a vehicle collision and, for example, includes a bag shaped cushion. The cushion is expanded and deployed by gas in case of an emergency in order to catch and protect a passenger. The cushion of the side airbag apparatus is expanded and deployed immediately next to the passenger from the side part of a vehicle seat in order to protect the passenger from a side collision and the ensuing rollover.

The cushion of the side airbag apparatus is configured so as to be expanded and deployed mainly by gas pressure and includes a gas generator referred to as an inflator as a gas supply source. A cylinder type (tube shaped) inflator is mainly used for the side airbag apparatus.

All or part of the cylinder type inflator is inserted into the cushion through an insertion hole provided in a base cloth configuring the cushion. The cushion with the inflator inserted therein is housed in a seat back of the vehicle seat together with the inflator while wound or folded in a long shape in the vertical direction of the vehicle.

Patent Document 1 describes an airbag apparatus in which the periphery of an airbag assembly (configured by an inflator and a folded cushion) is covered with a wrapping material which can rupture when the cushion is expanded and deployed. With this airbag apparatus, by covering the periphery of the airbag assembly with the wrapping material, the cushion in the folded state can be prevented from folding and collapsing.

RELATED ART DOCUMENTS

Patent Documents

Patent Document 1: JP 2003-104155 A

SUMMARY OF THE INVENTION

Problem to be Solved by the Invention

Incidentally, in order to be housed in the seat back of a vehicle seat, not only is the cushion wound or folded in a long shape in the vertical direction of a vehicle, but the upper part or lower part is also further folded back.

Unfortunately, when the upper part of the cushion is haphazardly folded back, the following problem arises. As one example, a case of one type of OOP (Out Of Position) test is assumed in which a passenger (small child such as a three year old child) stands on their knees facing backwards on the upper surface of the center console disposed between vehicle seats. Thereupon, the upper part of the cushion which is folded back beforehand and returned to the original position when expanded and deployed may inadvertently act on the passenger.

Moreover, when the lower part of the cushion is haphazardly folded back beforehand, even when the cushion is expanded and deployed, the normally seated passenger may not be able to be sufficiently protected.

In this way, the upper part or lower part of the cushion in the housed state is an important region which is associated with the deterioration of the neck damage value of the passenger along with the protection of their waist, depending on the deployment behavior during a side collision. Patent Document 1 does not include how to fold back the upper part or lower part of the cushion taking into consideration the neck damage value of the passenger or the protection of their waist, in addition to the configuration for retaining the folded back shape, even in an attempt to retain the shape in the housed state of the cushion via a wrapping material.

The present invention has been created in view of such a problem, with the object of providing a side airbag apparatus which can prevent the deterioration of the neck damage value of a passenger during a side collision or sufficiently protect the waist of the passenger.

Means for Solving the Problem

In order to solve the problems described above, an exemplary configuration of the side airbag device according to the present invention is a side airbag apparatus installed in a vehicle, including: a bag shaped cushion which is housed in a seat back of a vehicle seat and expanded and deployed on the side of the vehicle seat utilizing gas supplied from an inflator; and a holding part for retaining the shape in the housed state of the cushion, wherein the cushion is wound or folded in a long shape in the vertical direction of the vehicle and housed in the seat back in the shape with the upper part or lower part thereof further folded back to the anterior of the vehicle, and wherein the holding part retains the upper part or lower part of the cushion which is folded back to the anterior of the vehicle.

Here, the deployment behavior on the upper part of the cushion will be described in the OOP (Out Of Position) test (assuming the state in which a passenger (small child such as a three year old child) stands on their knees facing backwards on the upper surface of the center console disposed between vehicle seats. In the abovementioned configuration, the upper part of the cushion in the housed state is folded back to the anterior of the vehicle, with the shape further retained by the holding part. Consequently, when expanded and deployed, the cushion is temporarily first received by the chest of the passenger in the OOP state, then deployed through the side of the passenger (for example, between the passenger and the driver seat in the case of the cushion housed in a passenger seat). Therefore, in the abovementioned OOP test, deterioration of the neck damage value of the passenger can be prevented. Compared with this, if the upper part of the cushion is haphazardly folded back beforehand, for example, towards the center of the vehicle in the vehicle width direction, the upper part of the cushion, which is returned to the original position when expanded and deployed, may easily catch the lower jaw of the passenger, push the head up from below, and deteriorate the neck damage value.

Moreover, in the abovementioned configuration, the lower part of the cushion in the housed state may be folded back to the anterior of the vehicle, with the shape further retained by the holding part. Compared with the case in which the lower part of the cushion is haphazardly folded back beforehand towards the direction away from the side part of the vehicle seat in the vehicle width direction, for example, the cushion according to the present invention can reach and sufficiently protect the waist of the passenger when expanded and deployed because the lower part thereof is folded back to the anterior of the vehicle.

Here, "the shape in which the upper part or lower part of the cushion is folded back to the anterior of the vehicle" refers to the shape (state) in which the vicinity of the tip in the longitudinal direction of the upper part or lower part of the cushion (when the cushion is folded in a long shape) is placed in the vicinity of the side (edge part) serving as the end of the folded long shaped cushion toward the front of the vehicle in the anteroposterior direction of the vehicle. Note that, as seen from the vehicle side, this shape is formed when the upper part or lower part of the cushion is overlapped with the edge part of the folded long shaped cushion; in contrast, for example, a portion of the upper part or lower part of the cushion may protrude toward the front of the vehicle from the edge part of the cushion toward the front of the vehicle.

The holding part may have a looped auxiliary cloth attached to the surface of the cushion, wherein the tip of the upper part or lower part of this cushion folded back to the anterior of the vehicle may be inserted into the auxiliary cloth. As a result, when the tip of the upper part or lower part of the cushion is only inserted into the auxiliary cloth, the shape in the housed state of the cushion can be retained.

The holding part may include: a cover member which is a flexible cloth material for covering the entire cushion in the housed state; and a window part which is opened by the cover member, wherein the tip of the upper part or lower part of the cushion folded back to the anterior of the vehicle is passed from the inside to the outside of the cover member. As a result, only when the cushion is covered with the cover member and the tip of the upper part or lower part is disposed outside the cover member through the window part, can the shape in the housed state of the cushion be retained.

When the cloth material is sewn, the cover member may be bag shaped and have a non-sewn part which is not sewn, with the cushion capable of being placed from the outside to the inside of the cover member. In this way, the cushion can be disposed inside the bag shaped cover member so as to retain the shape in the housed state of the cushion.

The holding part may include: a winding member which is a flexible cloth material for being wound around a region excluding this upper part or lower part of the cushion before the upper or lower part is folded back; and a surrounding cloth which is sewn by the winding member, wherein the surrounding cloth may be disposed on the outer surface of the winding member with the winding member wound around the cushion and formed on this outer surface in a looped shape so as to surround the tip of the upper part or lower part of the cushion folded back to the anterior of the vehicle. According to such a configuration, the shape in the housed state of the cushion can be retained simply by surrounding the tip of the upper part or lower part of the cushion (which is folded back) by the surrounding cloth formed on the outer surface of the winding member in a looped shape.

The holding part may be a nonwoven cloth formed of ductile cloth materials including multiple polymer fibers, wherein, by fusing together at least part of the polymer fibers, the shape in the housed state of the cushion may be retained. According to such a configuration, only when the cushion is surrounded by the nonwoven cloth so as to fuse together part of the nonwoven cloth, can the shape in the housed state of the cushion be retained.

The holding part may be a felt material and manufactured by heating and pressing using a die. According to such a configuration, only when the cushion in the housed state is surrounded by the felt material and the felt material is further thermally fused using the die, can the shape in the housed state of the cushion be retained.

The holding part may be a flexible cloth material and include: a main body part which is long in the vertical direction and bag shaped (when the cloth material is sewn), in addition to having a non-sewn part which is not sewn, with the cushion capable of being placed from the outside to the inside of the cover member; a first flap part which extends from the non-sewn part of the main body part toward the front of the vehicle and covers a region not overlapping the folded back upper part or lower part of the cushion when folded back to the posterior of the vehicle; and a second flap part which extends from the non-sewn part of the main body part toward the front of the vehicle, is disposed upwards in the vehicle or downwards in the vehicle compared with the first flap part, has long dimensions in the anteroposterior direction of the vehicle, and covers a region not overlapping the upper part or lower part of the cushion folded back to the anterior of the vehicle when folded back to the posterior of the vehicle. Here, in the cushion in the housed state, the width in the anteroposterior direction of the vehicle at the upper part or lower part which is folded back is larger than the width in the anteroposterior direction of the vehicle at a region not overlapping the upper part or lower which is folded back. With that, in the abovementioned configuration, the upper part or lower part of the cushion which is folded back is covered with the second flap part having longer dimensions in the anteroposterior direction of the vehicle than the first flap part. As a result, the holding part can retain the shape in the housed state of the cushion.

The holding part further may include a third flap part which extends downwards in the vehicle or upwards in the vehicle from the main body part, wherein the third flap part may have an arc shaped lower edge or upper edge which serves as a folding back position when folded back to the upper side of the vehicle or to the lower side, wherein the third flap part may cover the upper part or lower part of the cushion folded back to the anterior of the vehicle when thus folded back, and wherein the third flap part may be sewn along the arc shaped lower edge or upper edge. Here, the folding back position at the upper part or lower part of the cushion which is folded back is arc shaped seen from the side. With that, in the abovementioned configuration, when the upper part or lower part of the cushion which is folded back is covered with the third flap part which is sewn in an arc shape along the lower edge or upper edge, the shape in the housed state of the cushion can be assuredly retained by the holding part.

The holding part further may include two leg parts which widen and extend downwards in the vehicle or upwards in the vehicle from the main body part, wherein, when the two leg parts are folded back while mutually crossed to the upper side of the vehicle or to the lower side, the two leg parts may be overlapped with the upper part or lower part of the cushion folded back to the anterior of the vehicle. As a result, the upper part or lower part of the cushion which is folded back is overlapped not only with the second flap part, but also with the two crossing leg parts. Therefore, the shape in the housed state of the cushion can be assuredly retained by the holding part.

The two leg parts may include: a first leg part provided at a slit; and a second leg part which is inserted into this slit so as to cross the first leg part. According to such a configuration, only when the second leg part is inserted into the slit of the first leg part, can the upper part or lower part of the cushion which is folded back be assuredly overlapped with the first leg part crossing the second leg part.

The holding part may be a flexible cloth material and include: a main body part which is long shaped in the vertical direction and bag shaped (when the cloth material is sewn), in addition to having a non-sewn part which is not sewn, with the cushion capable of being placed from the outside to the inside of the cover member; a fourth flap part which extends from the non-sewn part of the main body part toward the front of the vehicle and covers a region not overlapping the upper part or lower part of the cushion folded back to the anterior of the vehicle when folded back to the posterior of the vehicle; and a fifth flap part which extends downwards in the vehicle or upwards in the vehicle from the main body part, wherein the fifth flap part has an arc shaped lower edge or upper edge which serves as a folding back position when folded back to the upper side of the vehicle or to the lower side, wherein the fifth flap part covers the upper part or lower part of the cushion folded back to the anterior of the vehicle when thus folded back, and wherein the fifth flap part is sewn along the arc shaped lower edge or upper edge. Here, the folding back position at the upper part or lower part of the cushion which is folded back is arc shaped seen from the side. With that, in the abovementioned configuration, a region not overlapping the upper part or lower part of the cushion which is folded back is covered with the fourth flap part; moreover, the upper part or lower part of the cushion which is folded back is covered with the fifth flap part which is sewn in an arc shape along the lower edge or upper edge. Consequently, the shape in the housed state of the cushion can be assuredly retained by the holding part.

The front end of a sewing line along the arc shaped lower edge or upper edge of the fifth flap part may continue to a position higher than the rear end thereof. According to such a configuration, the upper part or lower part of the cushion folded back to the anterior of the vehicle can be assuredly retained in the front of the vehicle at the arc shaped lower edge or upper edge. Moreover, at the lower edge or upper edge in the fifth flap part, the position of the sewing line is lower in the rear of the vehicle than the front of the vehicle, such that the rear of the vehicle is accordingly not closed. Therefore, the upper part or lower part of the cushion which is folded back to the anterior of the vehicle is first pushed from the rear of the vehicle to the inside of the sewn fifth flap part, then subsequently pushed toward the front of the vehicle along the arc shaped lower edge or upper edge of the fifth flap part. In this way, the upper part or lower part of the cushion which is folded back to the anterior of the vehicle can be covered with the fifth flap part.

Effects of the Invention

The present invention allows for a side airbag apparatus to be provided which can prevent the deterioration of the neck damage value of a passenger during a side collision or sufficiently protect the waist of the passenger.

BRIEF DESCRIPTION OF THE DRAWINGS

FIG. 1 is a view schematically illustrating a side airbag apparatus according to Embodiment 1 of the present invention.

FIG. 2 is a view illustrating part of the side airbag apparatus of FIG. 1 in detail.

FIG. 3 is a view illustrating the behavior of a cushion of FIG. 2(*b*) when the cushion is expanded and deployed.

FIG. 4 is a view illustrating a side airbag apparatus of a comparative example.

FIG. 5 is a view illustrating a side airbag apparatus according to Embodiment 2 of the present invention.

FIG. 6 is a view illustrating a side airbag apparatus according to Embodiment 3 of the present invention.

FIG. 7 is a view illustrating the side airbag apparatus following the procedure illustrated in FIG. 6.

FIG. 8 is a view illustrating a side airbag apparatus according to Embodiment 4 of the present invention.

FIG. 9 is a view illustrating the state in which the side airbag apparatus of FIG. 8 is formed.

FIG. 10 is a view illustrating the shape in another housed state of a cushion.

FIG. 11 is a view illustrating a side airbag apparatus according to Embodiment 5 of the present invention.

FIG. 12 is a view illustrating the side airbag apparatus following the procedure illustrated in FIG. 11.

FIG. 13 is a view illustrating a side airbag apparatus according to Embodiment 6 of the present invention.

FIG. 14 is a view illustrating the side airbag apparatus following the procedure illustrated in FIG. 13.

FIG. 15 is a view illustrating a side airbag apparatus according to Embodiment 7 of the present invention.

FIG. 16 is a view illustrating the side airbag apparatus following the procedure illustrated in FIG. 15.

REFERENCE NUMERALS

100, 100A to 100G . . . Side airbag apparatus, 102, 108 . . . Vehicle seat, 104, 112 . . . Seat back, 106 . . . Door, 110 . . . Center console, 114, 114A . . . Cushion, 116 . . . Inflator, 118, 120 . . . Stud bolt, 122, 124, 170, 172 . . . Insertion hole of the cushion, 126 . . . Upper part of the cushion, 128, 138A, 138B, 150, 158, 176, 178, 180 . . . Holding part, 130 . . . Reinforcing cloth, 132 . . . Tip of the upper part of the cushion, 133, 181 . . . Edge part of the cushion toward the front of the vehicle, 134 . . . Upper surface of the center console, 136 . . . Dummy, 140A, 140B . . . Cover member, 142A, 142B . . . Window part, 144, 156 192, 192A, 198, 216 . . . Sewing line, 146, 194, 194A, 194B . . . Non-sewn part, 148 . . . Cushion region, 152 . . . Winding member, 154 . . . Surrounding cloth, 160 . . . Felt material, 162, 164 . . . Die, 166 . . . Inclined part of the die, 174 . . . Lower part of the cushion, 182A, 182B . . . Main body part, 184, 184A . . . First flap part, 186, 186A . . . Second flap part, 188 . . . Third flap part, 190, 190A . . . Upper end of the main body part, 196 . . . Lower edge of the third flap part, 202, 204 . . . Leg part, 206 . . . Lower flap part, 208 . . . Slit, 210 . . . Fourth flap part, 212 . . . Fifth flap part, 214 . . . Lower edge of the fifth flap part, 218 . . . Front end of the sewing line, 220 . . . Rear end of the sewing line

DESCRIPTION OF THE PREFERRED EMBODIMENT

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted.

Note that in the present specification and drawings, elements having substantially identical functions and configurations are labeled with identical symbols to omit redundant descriptions along with the illustration of elements not directly related to the present invention.

Embodiment 1

FIG. 1 is a view schematically illustrating a side airbag apparatus according to Embodiment 1 of the present invention. For example, as indicated by the dotted lines in the figure, a side airbag apparatus 100 is embedded in the side face on the center side of the vehicle of a seat back 104 of a vehicle seat 102. The vehicle seat 102 is the left side front seat (for example, a passenger seat) in the vehicle.

A side door 106 is disposed outside the vehicle of the vehicle seat 102, while a vehicle seat 108 serving as the right side front seat (for example, a driver seat) is disposed on the center side of the vehicle. Moreover, a center console 110 is disposed between the vehicle seats 102, 108. Note that the side airbag apparatus 100 may be embedded in the side face on the center side of the vehicle of the seat back 104 of the vehicle seat 102, but may also be embedded in the side face outside the vehicle of the seat back 104, the side face on the center side of the vehicle of a seat back 112 of the vehicle seat 108, or the side face outside the vehicle thereof.

FIG. 2 is a view illustrating part of the side airbag apparatus 100 of FIG. 1 in detail. The side airbag apparatus 100 includes a cushion 114 along with an inflator 116. The cushion 114 is formed into a bag shape, for example, via a method for sewing from a total of two base cloths configuring the front and back surfaces, a method for spinning and weaving using OPW (One-Piece Woven), etc.

The inflator 116 is a gas generator configured such that the internal gas generating agent is combusted to generate and supply gas. The inflator 116 is of a cylinder type (tube shaped) and inserted and attached into the cushion 114 as illustrated in FIG. 2(a).

Stud bolts 118, 120 protruding from the main body are provided on the inflator 116. The stud bolts 118, 120 are respectively inserted into two insertion holes 122, 124 formed in the cushion 114 as illustrated in FIG. 2(a), with the inflator 116 inserted into the cushion 114, and are passed from the inside to the outside of the cushion 114.

While wound or folded, the cushion 114 is housed inside the side face of the seat back 104 of the vehicle seat 102 on the center side of the vehicle as illustrated in FIG. 1. Note that the top of the cushion 114 in the housed state is covered with a seat cover, etc. and therefore cannot be visually recognized from the outside. In addition, utilizing the gas supplied from the inflator 116 during a side collision, etc., the cushion 114 cleaves the seat cover, etc. so as to be expanded and deployed on the side of the vehicle seat 102.

The shape in the housed state of the cushion will hereinafter be described. FIG. 2(a) illustrates the side facing the seat back 104 of the cushion 114. FIG. 2(b) illustrates the center side of the vehicle of the cushion 114. Note that the right side in the figure is the front of the vehicle. The cushion 114 is first wound or folded in a long shape in the vertical direction of the vehicle as illustrated in FIG. 2(a). Subsequently, as indicated by the arrow in FIG. 2(b), the upper part 126 of the cushion 114 is folded back to the anterior of the vehicle. In this way, the shape in the housed state of the cushion 114 is formed.

The side airbag apparatus 100 further includes a holding part 128 for retaining the shape in the housed state of the cushion 114. As illustrated in FIG. 2(b), the holding part 128 has a looped reinforcing cloth 130 attached to the surface of the cushion 114. The tip 132 of the upper part 126 of the cushion 114 folded back to the anterior of the vehicle is inserted into the reinforcing cloth 130. In this way, according to the side airbag apparatus 100, simply by inserting the tip 132 of the upper part 126 of the cushion 114 into the reinforcing cloth 130, the shape in the housed state of the cushion 114 can be retained.

Here, the shape in the housed state of the cushion 114, that is, the shape in which the upper part 126 of the cushion 114 is folded back to the anterior of the vehicle, refers to the shape in which the vicinity of the tip 132 in the longitudinal direction of the upper part 126 of the cushion 114 (when the cushion 114 is folded in a long shape (see FIG. 2(a)) is placed in the vicinity of the side (edge part 133) serving as the end of the folded long shaped cushion 114 toward the front of the vehicle in the anteroposterior direction of the vehicle, as illustrated in FIG. 2(b). Note that, as seen from the vehicle side, this shape is formed when the upper part 126 of the cushion 114 is overlapped with the edge part 133 of the folded long shaped cushion 114; in contrast, for example, as illustrated in FIG. 2(b), a portion of the upper part 126 of the cushion 114 may protrude toward the front of the vehicle from the edge part 133 of the cushion 114 toward the front of the vehicle.

FIG. 3 is a view illustrating the behavior of a cushion 114 of FIG. 2(b) when the cushion 114 is expanded and deployed. Note that the right side in the figure is the front of the vehicle. Here, as one example of the OOP (Out Of Position) test, the state is illustrated in which a dummy 136 imitating a passenger (small child such as a three year old child) stands on their knees facing backwards on the upper surface 134 of virtual lines of the center console 110 disposed between vehicle seats 102, 108.

With the side airbag apparatus 100, as illustrated in FIG. 3(a), the upper part 126 of the cushion 114 in the housed state is folded back to the anterior of the vehicle, with the shape further retained by the holding part 128. Consequently, when expanded and deployed, the cushion 114 is first temporarily received by the chest of the dummy 136 in the OOP state as illustrated in FIG. 3(b). Consequently, the cushion 114 is subsequently passed through the side of the dummy 136 (here, between the dummy 136 and the vehicle seat 108) so as to be deployed.

FIG. 4 is a view illustrating a side airbag apparatus 300 of a comparative example. As illustrated in FIG. 4(a), the side airbag apparatus 300 is different from the side airbag apparatus 100 according to Embodiment 1, in that an upper part 304 of a cushion 302 is haphazardly folded back, for example, just beside, that is, toward the center of the vehicle in the vehicle width direction.

If the same OOP test as illustrated in FIG. 3 is carried out in the comparative example of FIG. 4, in the side airbag apparatus 300 of FIG. 4, the upper part 304 of the cushion 302 which is returned to the original position when expanded and deployed, as illustrated in FIG. 4(b), may easily catch the lower jaw of the dummy 136, push the head up from below, and deteriorate the neck damage value.

In contrast, according to the side airbag apparatus 100 of FIG. 3, the upper part 126 of the cushion 114 which is folded back to the anterior of the vehicle is temporarily received by the chest of the dummy 136 in the OOP state, after which the cushion 114 is passed through the side of the dummy 136, thereby enabling prevention of the neck damage value of the passenger in the OOP test from deteriorating.

Embodiment 2

FIG. 5 is a view illustrating side airbag apparatuses 100A, 100B according to Embodiment 2 of the present invention.

The side airbag apparatus 100A illustrated in FIG. 5(a) includes a holding part 138A. The holding part 138A has a cover member 140A along with a window part 142A. The cover member 140A is a flexible cloth material, such as a nonwoven cloth, sewn so as to be bag shaped as illustrated in a sewing line 144. Moreover, the cover member 140A has a non-sewn part 146 which is not sewn, in which the cushion 114 (dotted lines in the figure) can be placed from the outside to the inside of the cover member 140A. The window part 142A is an opening opened in the cover member 140A, wherein the tip 132 of the upper part 126 of the cushion 114 folded back to the anterior of the vehicle is passed from the inside to the outside of the cover member 140A.

According to the side airbag apparatus 100A, only when the cushion 114 is disposed from the non-sewn part 146 of the bag shaped cover member 140A into the cover member 140A and the tip 132 of the upper part 126 is further disposed outside the cover member 140A through the window part 142A, can the shape in the housed state of the cushion 114 be retained.

The side airbag apparatus 100B illustrated in FIG. 5(b) includes a holding part 138B. The holding part 138B has a cover member 140B along with a window part 142B. The cover member 140B is a flexible cloth material, such as a nonwoven cloth, folded over so as to cover the overall cushion 114 in the housed state. A window part 142B is an opening opened in the cover member 140B, wherein the tip 132 of the upper part 126 of the cushion 114 folded back to the anterior of the vehicle is passed from the inside to the outside of the cover member 140B which is folded over.

According to the side airbag apparatus 1006, only when the cushion 114 is covered with the cover member 140B and the tip 132 of the upper part 126 is further disposed outside the cover member 140A through the window part 142B, can the shape in the housed state of the cushion 114 be retained.

Embodiment 3

FIG. 6 is a view illustrating a side airbag apparatus 100C according to Embodiment 3 of the present invention. FIG. 7 is a view illustrating the side airbag apparatus 100C following the procedure illustrated in FIG. 6. The procedure by which the shape is retained in the housed state of the cushion 114 in the side airbag apparatus 100C will hereinafter be described.

First, the cushion 114 illustrated in FIG. 6(a) is in the state of being wound or folded back. Note that the cushion 114 includes a region 148 excluding the upper part 126 before the upper part 126 is folded back. Moreover, as illustrated in the A-A cross section of FIG. 6(b), the inflator 116 is inserted into the cushion 114, with the stud bolt 118 further passed therethrough. Note that the stud bolt 120 is not illustrated in the A-A cross section of FIG. 6(b).

The side airbag apparatus 100C includes a holding part 150 illustrated in FIG. 6(c). The holding part 150 has a winding member 152 along with a surrounding cloth 154. The surrounding cloth 154 is sewn in the winding member 152 as illustrated in a sewing line 156.

The side airbag apparatus 100C using the holding part 150 is formed as follows. As illustrated in the B-B cross section of FIG. 6(d), the winding member 152 is first passed through the stud bolt 118. Subsequently, as indicated by the arrow in FIG. 6(c), the winding member 152 is wound around the region 148 of the cushion 114. When the winding member 152 is wound, the surrounding cloth 154, as illustrated in FIG. 6(e), is disposed on the outer surface of the winding member 152. Further, the winding member 152 wound around the region 148 of the cushion 114 is passed through the stud bolt 118 as illustrated in the C-C cross section of FIG. 6(f).

Subsequently, as indicated by the arrow in FIG. 6(e), the upper part 126 of the cushion 114 is folded back to the anterior of the vehicle. As a result, the upper part 126 and the tip part 132 of the cushion 114 are adjacent to the surrounding cloth 154, as illustrated in FIG. 7(a). However, as illustrated in the D-D cross section of FIG. 7(b), the tip 132 of the upper part 126 of the cushion 114 has not yet been surrounded by the surrounding cloth 154.

With that, as indicated by the arrow in FIG. 7(a), the surrounding cloth 154 is folded back so as to be formed in a looped shape. As a result, as illustrated in FIG. 7(c), the surrounding cloth 154 covers the tip 132 of the upper part 126 of the cushion 114. Further, the surrounding cloth 154 covering the tip 132 of the upper part 126 of the cushion 114 is passed through the stud bolt 118 as illustrated in the E-E cross section of FIG. 7(d).

Therefore, according to the side airbag apparatus 100C, only when the winding member 152 is wound around the region 148 of the cushion 114 and the tip 132 of the upper part 126 of the cushion 114 which is folded back is surrounded by the surrounding cloth 154 formed on the outer surface of the winding member 152 in a looped shape, can the shape in the housed state of the cushion 114 be retained by the holding part 150.

Embodiment 4

FIG. 8 is a view illustrating a side airbag apparatus 100D according to Embodiment 4 of the present invention. FIG. 9 is a view illustrating the state in which the side airbag apparatus 100D of FIG. 8 is formed. The procedure by which the shape is retained in the housed state of the cushion in the side airbag apparatus 100D will hereinafter be described.

First, the cushion 114 illustrated in FIG. 8(a) is simply wound or folded back before the upper part 126 is folded back. Moreover, as illustrated in the F-F cross section of FIG. 8(b), the inflator 116 is inserted into the cushion 114, with the stud bolt 118 further passed therethrough.

Subsequently, as indicated by the arrow in FIG. 8(a), the upper part 126 of the cushion 114 is folded back to the anterior of the vehicle. As a result, as illustrated in the G-G cross section of FIGS. 8(c) and 8(d), the upper part 126 and the tip 132 of the cushion 114 overlap the region 148 of the cushion 114.

The side airbag apparatus 100D includes a holding part 158 illustrated in FIG. 8(e). The holding part 158 includes a nonwoven cloth (here, a felt material 160) formed of ductile cloth materials including multiple polymer fibers.

Subsequently, as illustrated in FIGS. 8(c) and 8(d), the cushion 114 (when the upper part 126 is folded back to the anterior of the vehicle) is surrounded by the felt material 160 illustrated in FIG. 8(e) and further pressed using dies 162, 164 as indicated by the arrow in the figure. Note that at this time, not only pressing but also heating, using the dies 162, 164, is carried out. In doing so, the felt material 160 functions as the holding part 158 for retaining the shape in the housed state of the cushion 114 by thermally fusing at least part of the polymer fibers, as illustrated in FIG. 8(f).

Further, the die 162 has an inclined part 166. Here, the case is assumed in which the tip 132 of the upper part 126 of the cushion 114 which is folded back to the anterior of the vehicle is surrounded by the felt material 160 illustrated in FIG. 9(a) and moved to the rear of the vehicle. Even in such a case, the tip 132 of the upper part 126 of the cushion 114 can be pressed by the dies 162, 164, thereby pressed to the inclined part 166 of the die 162 via the felt material 160, and as indicated by the arrow in FIG. 9(b), moved along the inclined part 166, then returned to the original position which is folded back to the anterior of the vehicle.

Therefore, according to the side airbag apparatus 100D, only when the cushion 114 in the housed state is surrounded by the felt material 160 and the felt material 160 is further thermally fused using the dies 162, 164, can the shape in the housed state of the cushion 114 be retained by the holding part 158.

The felt material 160 will hereinafter be described. The felt material 160, for example, may be a polyester felt manufactured via a known needle method involving entangling polyester fibers by needle processing and fixing each other. Polyester fibers can be provided as polyethylene terephthalate (PET), wherein the felt materials may be made of 100% PET. Fibers configuring felt materials are randomly or pseudo-randomly entangled. Moreover, the felt can include two kinds of fibers of different configurations.

Moreover, while not limited thereto, all single component fibers configuring the felt can be formed of PET homopolymers, wherein two component conjugate fibers having cores and a coating surrounding the cores can be used. The cores and coating of the two component conjugate fibers are configured to have different properties, specifically different melting points, such that the coating has a significantly lower melting point than the cores (for example, in the range of 120 to 150° C.). While not limited thereto, both component conjugate fibers can be formed of PET, wherein the cores can be molded by PET homopolymers, while the coating can be formed of PET copolymers (coPET). When such a PET and coPET are combined, while the melting point of the coating is lower than the melting point of the cores, overall, the fibers can be assuredly formed of PET.

Both cores of the two component conjugate fibers and the single component fibers are formed of PET homopolymers and therefore have the same melting point, with the single component fibers having a melting point higher than the coating of the two component conjugate fibers. The two component conjugate fibers are equally distributed to the overall single component fibers in felt materials. The two component conjugate fibers can account for 30% to 60% of all fibers of felt materials, while all the remaining fibers can be the single component fibers. Note that materials used in the abovementioned single component fibers and two component conjugate fibers may be configured to partially include the abovementioned fibers as long as the fibers can be effectively fused together.

Subsequently, pressing using the dies 162, 164 will be described in detail. The cushion 114 (when the upper part 126 is folded back to the anterior of the vehicle) is covered with the felt material 160 so as to mold an intermediate package. Subsequently, the position surrounded by the felt material 160 so as to be compressed is pressed using a pressing apparatus (not illustrated) including the dies 162, 163, and compressed into the desired three dimensional shape and size. By applying heat to the intermediate package, for example, the pressing apparatus is operated at a temperature exceeding the melting point of the coating of the two component conjugate fibers but lower than the melting point of the cores of the two component conjugate fibers along with the single component fibers. Note that heat and pressure are not required to be simultaneously applied to a package. In accordance with the properties of the flexibility of the cushion 114 along with the initial flexibility of the felt material 160, the intermediate package can be pressed and compressed to easily obtain a three dimensional shape.

Moreover, if the cushion 114 is formed of a plastic cloth, pressure and heat are simultaneously applied to the intermediate package, such that the cloth of the cushion 114 is compressed so as to be plastically deformed. The cushion 114 (when the upper part 126 is folded back to the anterior of the vehicle) in the intermediate package can maintain the compressed shape even after cooling. In contrast, even if the cushion 114 is not formed of materials which are plastically deformed, when heat and pressure are simultaneously applied to the intermediate package, felt materials of the felt material 160 become thin (for example, 0.55 mm) (because fibers are mutually compressed when compressed) and are plastically deformed in any case. More specifically, when heated at temperatures higher than the melting point of the coating of the two component conjugate fibers, the coating is dissolved. Therefore, the coating is fused together at all positions in which fibers in the felt material 160 are distributed. Here, because the felt material 160 is heated at a temperature lower than the melting point of the cores of the two component conjugate fibers along with the overall structure of the single component fibers, the cores and the single component fibers are still in the solid phase, and not fused together, with only the materials of the coating fused.

Note that in the side airbag apparatuses 100 and 100A to 100D according to the abovementioned Embodiments 1 to 4, while not limited to thereto, the state in which the upper part 126 of the cushion 114 is folded back to the anterior of the vehicle is exemplified as the shape in the housed state of the cushion 114. That is, the state in which the lower part of the cushion 114 (see FIG. 10) is folded back to the anterior of the vehicle may be regarded as the shape in the housed state of the cushion 114, with this shape capable of being retained by each holding part 128, 138A, 138B, 150, and 158.

FIG. 10 is a view illustrating the shape in another housed state of a cushion 114A. Note that the right side in the figure is the front of the vehicle. The inflator 116 is attached inside the cushion 114A, such that a portion of the inflator 116 is inserted into the vicinity of the center through an insertion hole 170 formed in the cushion 114A. Within the inflator 116 inserted into the cushion 114A, the stud bolt 118 is disposed outside the cushion 114A as illustrated. In contrast, the stud bolt 120 is inserted into an insertion hole 172 formed in the cushion 114A, then passed from the inside to the outside of the cushion 114A.

Moreover, the lower part 174 of the cushion 114A is folded back to the anterior of the vehicle. Note that the cushion 114A includes a region 175 not overlapping the lower part 174 which is folded back. When the lower part 174 of the cushion 114A is folded back to the anterior of the vehicle, the cushion 114A can reach and sufficiently protect the waist of the passenger when expanded and deployed.

Hereinafter, side airbag apparatuses 100E, 100F, 100G in Embodiments 5, 6, and 7 illustrated in FIGS. 11 to 16 respectively have holding parts 176, 178, and 180 for retaining the shape in the housed state of the cushion 114A when the lower part 174 thereof is folded back to the anterior of the vehicle.

Here, as illustrated in FIG. 10, the shape in the housed state of the cushion 114A, that is, the shape in which the lower part 174 of the cushion 114A is folded back to the anterior of the vehicle, refers to the shape in which the vicinity of the tip in the longitudinal direction of the lower part 174 of the cushion 114A (when the cushion 114A is folded in a long shape) is placed in the vicinity of the side (edge part 181) serving as the end of the folded long shaped cushion 114A toward the front of the vehicle in the anteroposterior direction of the vehicle. Note that, as seen from the vehicle side, this shape is formed when the lower part 174 of the cushion 114A is overlapped with the edge part 181 of a folded long shaped cushion 114A; in contrast, for example, as illustrated in FIG. 10, a portion of the lower part 174 of the cushion 114A may protrude toward the front of the vehicle from the edge part 181 of the cushion 114A toward the front of the vehicle.

Embodiment 5

FIG. 11 is a view illustrating a side airbag apparatus 100E according to Embodiment 5 of the present invention. FIG. 12 is a view illustrating the side airbag apparatus 100E following the procedure illustrated in FIG. 11. The procedure by which the shape is retained in the housed state of the cushion 114A in the side airbag apparatus 100E will hereinafter be described.

The side airbag apparatus 100E includes a holding part 176 illustrated in FIG. 11(a). Note that FIG. 11(a) illustrates the deployed state of the holding part 176. The holding part 176 is a flexible cloth material and, for example, has a main body part 182, a first flap part 184, a second flap part 186, and a third flap part 188.

The main body part 182 is long shaped in the vertical direction and folded over as illustrated in FIG. 11(b), with the upper end 190 thereof sewn as illustrated in a sewing line 192 so as to be bag shaped. Further, the main body part 182 has a non-sewn part 194 which is not sewn, with the cushion 114A capable of being placed from the outside to the inside.

As illustrated in FIG. 11(b), the first flap part 184 extends from the non-sewn part 194 of the main body part 182 toward the front of the vehicle. The second flap part 186 extends from the non-sewn part 194 of the main body part 182 toward the front of the vehicle, is disposed downwards in the vehicle compared with the first flap part 184, and further has long dimensions in the anteroposterior direction of the vehicle.

In the figure, the outer shape of the cushion 114A (when the lower part 174 is folded back to the anterior of the vehicle) is indicated by the dotted lines. The cushion 114A includes: the lower part 174 which is folded back to the anterior of the vehicle; and the region 175 not overlapping the lower part 174, wherein the lower part 174 has an outer shape with a larger width in the anteroposterior direction of the vehicle than the region 175. Such a cushion 114A is placed inside from the non-sewn part 194 of the main body part 182 and first pushed so as to contact the upper end 190, after which the lower part 174 thereof is placed inside the third flap part 188.

The third flap part 188 extends downwards in the vehicle from the main body part 182, wherein, as illustrated in FIG. 11(b), a lower edge 196 serving as a folding back position (when folded back to the upper side of the vehicle) is arc shaped. In addition, the third flap part 188 covers the lower part 174 of the cushion 114A which is folded back to the anterior of the vehicle when folded back. Further, the third flap part 188 is sewn along the arc shaped lower edge 196 as indicated by a sewing line 198.

Subsequently, as illustrated in FIG. 12(a), the first flap part 184 is folded back to the posterior of the vehicle so as to cover the region 175 of the cushion 114A; moreover, the second flap part 186 is folded back to the posterior of the vehicle so as to cover the lower part 174 of the cushion 114A. In addition, as illustrated in FIG. 12(b), the third flap part 188 is passed through the stud bolt 120 of the inflator 116.

In this way, in the side airbag apparatus 100E, when the lower part 174 of the cushion 114A which is folded back to the anterior of the vehicle is covered with the second flap part 186 having longer dimensions in the anteroposterior direction of the vehicle than the first flap part 184, the shape in the housed state the cushion 114A can be retained by the holding part 176.

Further, the folding back position of the lower part 174 of the cushion 114A folded back to the anterior of the vehicle is arc shaped when seen from the side as illustrated in FIG. 10. In contrast, in the side airbag apparatus 100E, because the lower part 174 of the cushion 114A which is folded back to the anterior of the vehicle is covered with the third flap part 188 which is sewn in an arc shape along the lower edge 196, the shape in the housed state the cushion 114A can be assuredly retained by the holding part 176.

Embodiment 6

FIG. 13 is a view illustrating a side airbag apparatus 100F according to Embodiment 6 of the present invention. FIG. 14 is a view illustrating the side airbag apparatus 100F following the procedure illustrated in FIG. 13. The procedure by which the shape is retained in the housed state of the cushion 114A in the side airbag apparatus 100F will hereinafter be described.

The side airbag apparatus 100F includes a holding part 178 illustrated in FIG. 13(a). Note that FIG. 13(a) illustrates the deployed state of the holding part 178. The holding part 178 is a flexible cloth material and, for example, has a main body part 182A, a first flap part 184A, a second flap part 186A, two leg parts 202, 204, and a lower flap part 206.

The main body part 182A is long shaped in the vertical direction and folded over as illustrated in FIG. 13(b), with the upper end 190A thereof sewn as illustrated in a sewing line 192A so as to be bag shaped. Further, the main body part 182A has a non-sewn part 194A which is not sewn, with the cushion 114A capable of being placed from the outside to the inside.

As illustrated in FIG. 13(b), the first flap part 184A extends from the non-sewn part 194A of the main body part 182A toward the front of the vehicle. The second flap part 186A extends from the non-sewn part 194A of the main body part 182A toward the front of the vehicle, is disposed downwards in the vehicle compared with the first flap part 184A, and further has long dimensions in the anteroposterior direction of the vehicle.

Moreover, the cushion 114A includes: the lower part 174 which is folded back to the anterior of the vehicle as indicated by the dotted lines; and the region 175 not overlapping the lower part 174, wherein the lower part 174 has an outer shape with a larger width in the anteroposterior direction of the vehicle than the region 175. The cushion 114A is placed inside from the non-sewn part 194A of the main body part 182A and first pushed so as to contact the upper end 190A of the main body part 182A.

As illustrated in FIG. 13(a), the two leg parts 202, 204 widen and extend downwards in the vehicle from the main body part 182A. Moreover, as illustrated in FIG. 13(b), the leg parts 202, 204 are folded back while crossing each other upwards in the vehicle and overlap the lower part 174 of the cushion 114A which is folded back to the anterior of the vehicle. A slit 208 is further provided in the leg part 202. As illustrated in FIG. 14(a), the leg part 204 is inserted into this slit 208 so as to cross the leg part 202.

As illustrated in FIG. 13(a), the lower flap part 206 is disposed between the leg parts 202, 204 and extends downwards in the vehicle from the main body part 182A. Moreover, as illustrated in FIG. 13(b), the lower flap part 206 covers the lower part 174 of the cushion 114A (which is folded back to the anterior of the vehicle when folded back to the upper side of the vehicle), together with the crossing leg parts 202, 204.

However, prior to crossing the leg parts 202, 204 in the holding part 178, as illustrated in FIG. 14(a), the first flap part 184A is folded back to the posterior of the vehicle so as to cover the region 175 of the cushion 114A and moreover cross the leg parts 202, 204. Subsequently, the second flap part 186A is folded back to the posterior of the vehicle so as to cover the lower part 174 of the cushion 114A. In addition, as illustrated in FIG. 14(b), the lower part 174 of the cushion 114A is covered with a lower flap part 202 and further passed through the stud bolt 120 of the inflator 116.

In this way, in the side airbag apparatus 100F, when the lower part 174 of the cushion 114A which is folded back to the anterior of the vehicle is covered with the second flap part 186A having longer dimensions in the anteroposterior direction of the vehicle than the first flap part 184A, the shape in the housed state the cushion 114A can be retained by the holding part 178.

Further, in the side airbag apparatus 100F, because the lower part 174 of the cushion 114A which is folded back to the anterior of the vehicle can be assuredly overlapped with the second flap part 186A along with the two crossing leg parts 202, 204, the shape in the housed state the cushion 114A can be assuredly retained by the holding part 178.

Embodiment 7

FIG. 15 is a view illustrating a side airbag apparatus 100G according to Embodiment 7 of the present invention. FIG. 16 is a view illustrating the side airbag apparatus 100G following the procedure illustrated in FIG. 15. The procedure by which the shape is retained in the housed state of the cushion 114A in the side airbag apparatus 100G will hereinafter be described.

The side airbag apparatus 100G includes the holding part 180. Note that FIG. 15(a) illustrates the deployed state of the holding part 180. The holding part 180 is a flexible cloth material and, for example, has a main body part 182B, a fourth flap part 210, and a fifth flap part 212.

The main body part 182B is long shaped in the vertical direction and folded over as illustrated in FIG. 15(b), with the upper end 190B thereof sewn as illustrated in a sewing line 192B so as to be bag shaped. Further, the main body part 182B has a non-sewn part 194B which is not sewn, with the cushion 114A capable of being placed from the outside to the inside. As illustrated in FIG. 15(b), the fourth flap part 210 extends from the non-sewn part 194B of the main body part 182B toward the front of the vehicle.

As illustrated in FIG. 15(a), the fifth flap part 212 extends downwards in the vehicle from the main body part 182B. Moreover, as illustrated in FIG. 15(b), the lower edge 214 of the fifth flap part 212 serving as a folding back position (when folded back to the upper side of the vehicle) is arc shaped. In addition, the fifth flap part 212 covers the lower part 174 of the cushion 114A which is folded back to the anterior of the vehicle when folded back. Further, the fifth flap part 212 is sewn along the arc shaped lower edge 214 as indicated by a sewing line 216.

As indicated by the dotted lines of FIG. 15(b), the cushion 114A includes: the lower part 174 which is folded back to the anterior of the vehicle; and the region 175 not overlapping the lower part 174, wherein the lower part 174 has an outer shape with a larger width in the anteroposterior direction of the vehicle than the region 175. Consequently, the cushion 114A is placed inside from the non-sewn part 194b of the main body part 182b and first pushed so as to contact the upper end 190b of the main body part 182b.

Here, as illustrated in FIG. 15(b), the front end 218 of the sewing line 216 of the fifth flap part 212 continues to a position higher than the rear end 220 thereof. That is, at the lower edge 214 in the fifth flap part 212, the position of the sewing line 216 is lower in the rear of the vehicle than the front of the vehicle, such that the rear of the vehicle is accordingly not closed.

With that, after the cushion 114A is pushed so as to contact the upper end 190B of the main body part 182B, the lower part 174 of the cushion 114A which is folded back to the anterior of the vehicle is first pushed into the fifth flap part 212 from the rear of the vehicle, then pushed toward the front of the vehicle along the lower edge 214.

In this way, the lower part 174 of the cushion 114A which is folded back to the anterior of the vehicle can be pushed into the fifth flap part 212. Moreover, because the front end 218 of a sewing line 212 continues to a position higher than the rear end 220 thereof, the lower part 174 of the cushion 114A which is folded back to the anterior of the vehicle can be assuredly retained in the front of the vehicle at the arc shaped lower edge 214.

Subsequently, as illustrated in FIG. 16(a), the fourth flap part 210 is folded back to the posterior of the vehicle so as to cover the region 175 of the cushion 114A; and moreover, the fifth flap part 212 is folded back to the upper side of the vehicle so as to cover the lower part 174 of the cushion 114A. In addition, as illustrated in FIG. 16(b), the fifth flap part 212 is passed through the stud bolt 120 of the inflator 116.

Here, the folding back position of the lower part 174 of the cushion 114A folded back to the anterior of the vehicle is arc shaped seen from the side as illustrated in FIG. 10. In contrast, in the side airbag apparatus 100G, the region 175 of the cushion 114A is covered with the fourth flap part 210; moreover, the lower part 174 of the cushion 114A which is folded back to the anterior of the vehicle is covered with the fifth flap part 212 which is sewn in an arc shape along the lower edge 214. Consequently, according to the side airbag apparatus 100G, the shape in the housed state of the cushion 114A can be assuredly retained by the holding part 180.

Note that in the side airbag apparatuses 100E, 100F, and 100G according to the abovementioned Embodiments 5 to 7, while not limited to thereto, the state in which the lower part 174 of the cushion 114A is folded back to the anterior of the vehicle is exemplified as the shape in the housed state of the cushion 114A. That is, the state in which the upper part of the cushion 114A is folded back to the anterior of the vehicle may be regarded as the shape in the housed state of the cushion 114A, with this shape capable of being retained by each holding part 176, 178, 180. Note that in this case, the shape of each holding part 176, 178, 180 may be a vertically inverted shape, etc. in accordance with the position of the upper part of the cushion 114A which is folded back to the anterior of the vehicle.

While the preferred embodiments according to the present invention have been thus described in detail with reference to the appended drawings, needless to say, the present invention is not limited to examples according to the present invention. Those skilled in the art will clearly be able to arrive at various changes or modifications within the scope described in Scope of the Patent Claims and it is understood that these naturally belong to the technical scope of the present invention.

Moreover, the example in which the side airbag apparatus according to the present invention is applied to automobiles has been described in the abovementioned embodiments. However, in addition to automobiles, the present invention can be applied to aircrafts, ships, etc., with the same operations and effects capable of being exerted.

INDUSTRIAL APPLICABILITY

The present can be utilized in a side airbag apparatus which is installed in a vehicle and expanded and deployed in order to protect a passenger in case of an emergency.

The invention claimed is:

1. A side airbag apparatus for installation in a seat back of a seat of a vehicle, the side airbag apparatus comprising:
   a bag shaped cushion for expansion and deployment utilizing gas supplied from an inflator; and
   a holding part for retaining a shape of the cushion in a housed state of the cushion;
   wherein the cushion is wound or folded in a long shape with one of an upper part and lower part of the bag shaped cushion folded back to create a folded portion of the cushion, and
   wherein the holding part retains the folded portion of the cushion,
   wherein the holding part includes:
   a cover member which is a flexible cloth material for covering the cushion in the housed state; and
   a window part which is opened by the cover member, wherein a tip of the upper part or lower part of the cushion is folded back to create the folded portion and the folded portion is passed from an inside of the cover member to an outside of the cover member.

2. The side airbag apparatus according to claim 1, wherein, when the cloth material is sewn, the cover member is bag shaped and has a non-sewn part which is not sewn, with the cushion capable of being placed from the outside to the inside of the cover member.

3. The side airbag apparatus according to claim 1, wherein the cover member is a nonwoven cloth.

* * * * *